United States Patent
Kondo et al.

(10) Patent No.: US 8,441,435 B2
(45) Date of Patent: May 14, 2013

(54) IMAGE PROCESSING APPARATUS, IMAGE PROCESSING METHOD, PROGRAM, AND RECORDING MEDIUM

(75) Inventors: Tetsujiro Kondo, Tokyo (JP); Tetsushi Kokubo, Kanagawa (JP); Kenji Tanaka, Kanagawa (JP); Hitoshi Mukai, Kanagawa (JP); Kazumasa Tanaka, Chiba (JP); Hiroyuki Morisaki, Tokyo (JP); Hirofumi Hibi, Kanagawa (JP)

(73) Assignee: Sony Corporation, Tokyo (JP)

( * ) Notice: Subject to any disclaimer, the term of this patent is extended or adjusted under 35 U.S.C. 154(b) by 954 days.

(21) Appl. No.: 12/418,884

(22) Filed: Apr. 6, 2009

(65) Prior Publication Data

US 2009/0271732 A1  Oct. 29, 2009

(30) Foreign Application Priority Data

Apr. 24, 2008  (JP) .................... 2008-114408

(51) Int. Cl.
*G09G 5/00* (2006.01)
(52) U.S. Cl.
USPC ........................................... 345/156
(58) Field of Classification Search .................. 345/4, 7, 345/9, 24, 156, 501, 619, 620; 715/781; 348/207.99
See application file for complete search history.

(56) References Cited

U.S. PATENT DOCUMENTS

| | | | | |
|---|---|---|---|---|
| 6,154,558 A * | 11/2000 | Hsieh | ............................. | 382/103 |
| 6,795,209 B1 * | 9/2004 | Patton et al. | | |
| 6,801,642 B2 * | 10/2004 | Gorday et al. | ............... | 382/118 |
| 6,987,535 B1 * | 1/2006 | Matsugu et al. | ............... | 348/239 |
| 7,002,600 B2 * | 2/2006 | Okada et al. | ................... | 345/625 |
| 7,970,968 B2 * | 6/2011 | Kondo et al. | ................. | 710/100 |
| 8,131,016 B2 * | 3/2012 | Steinberg et al. | ............. | 382/103 |
| 8,138,991 B2 * | 3/2012 | Rorberg et al. | .................... | 345/8 |
| 2003/0086134 A1 * | 5/2003 | Enomoto | ...................... | 358/538 |
| 2005/0122401 A1 | 6/2005 | Horie | | |
| 2005/0248681 A1 * | 11/2005 | Nozaki et al. | ................. | 348/345 |
| 2006/0098087 A1 | 5/2006 | Brandt et al. | | |
| 2006/0158730 A1 * | 7/2006 | Kira | ............................. | 359/462 |
| 2007/0222859 A1 * | 9/2007 | Chang et al. | .................. | 348/148 |
| 2007/0229659 A1 * | 10/2007 | Yamaguchi | ................... | 348/143 |
| 2008/0062291 A1 | 3/2008 | Sako et al. | | |
| 2009/0102940 A1 * | 4/2009 | Uchida | ...................... | 348/222.1 |
| 2010/0253825 A1 | 10/2010 | Horie | | |

FOREIGN PATENT DOCUMENTS

EP  1 898 632 A1  3/2008
JP  10-191288  7/1998

(Continued)

OTHER PUBLICATIONS

European Search Report issued Sep. 23, 2011, in Patent Application No. 09156809.7.

*Primary Examiner* — Joe H Cheng
(74) *Attorney, Agent, or Firm* — Oblon, Spivak, McClelland, Maier & Neustadt, L.L.P.

(57) ABSTRACT

An image processing apparatus includes an input unit to which an image of an object picked up by an image pickup device is input, a display device on which the image is presented, an image presenting unit configured to present the image on the display device; a viewpoint detecting unit configured to detect a viewpoint position of a user, and a control unit configured to supply, to the image presenting unit, the image in an area extracted corresponding to an image frame of a display surface of the display device when the image is viewed through the display surface from the viewpoint position of the user detected by the viewpoint detecting unit.

10 Claims, 20 Drawing Sheets

FOREIGN PATENT DOCUMENTS

| | | |
|---|---|---|
| JP | 2000-165738 | 6/2000 |
| JP | 2005-110162 | 4/2005 |
| JP | 2006-101561 | 4/2006 |
| JP | 2007-324976 | 12/2007 |

\* cited by examiner

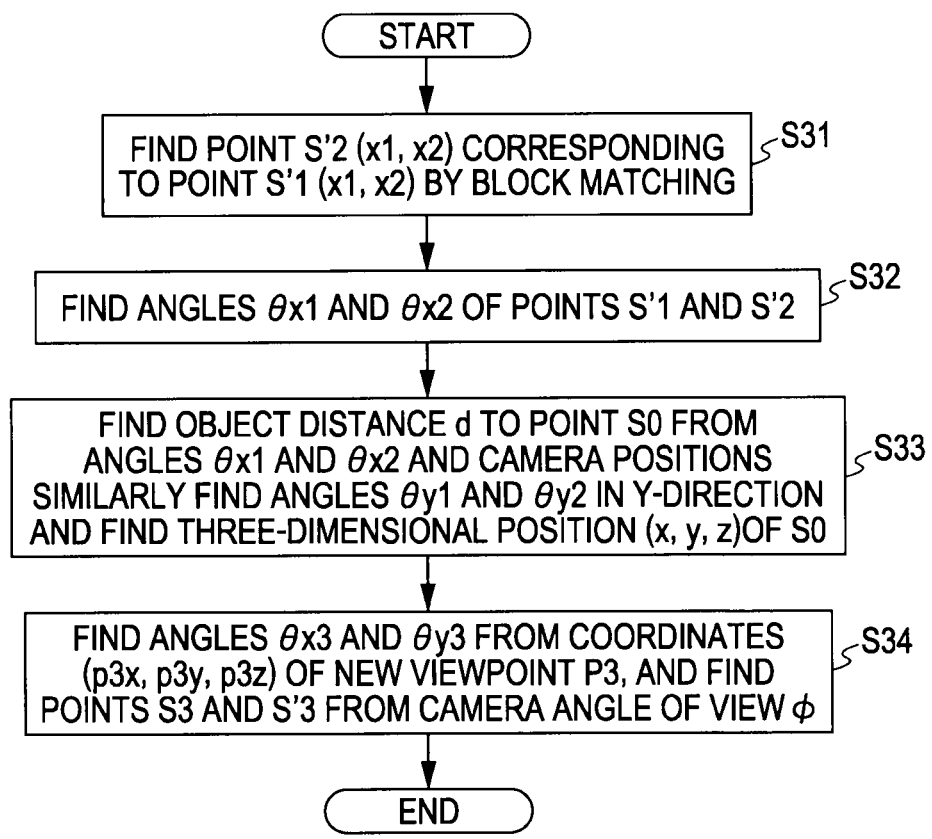

IMAGE PROCESSING APPARATUS, IMAGE PROCESSING METHOD, PROGRAM, AND RECORDING MEDIUM

BACKGROUND OF THE INVENTION

1. Field of the Invention

The present invention relates to an image processing apparatus, an image processing method, a program, and a recording medium, for example, which are suitably used to obtain information about a specific portion of an image projected on a screen.

2. Description of the Related Art

An interface apparatus called a head mount display (HMD) that is worn on the head of the user has been used as an image display apparatus for realizing virtual reality and displaying a virtual screen in front of the user's eyes. When the user wears the head mount display, a displayed image changes in accordance with the eye direction of the user.

Japanese Unexamined Patent Application Publication No. 2006-101561 discloses a technique for interlocking a base unit and a sub-unit so that the user can view information, such as characters, regarding an image displayed on the base unit.

Japanese Unexamined Patent Application Publication No. 10-191288 discloses a technique for detecting the line of sight of the user and simultaneously displaying an image taken by a camera and an image received by a receiving device.

SUMMARY OF THE INVENTION

There are two typical techniques for superimposing images. The first technique uses a virtual-image optical system. Unfortunately, according to this technique, the object distance easily becomes inconsistent with the position of the virtual image. In contrast, the second technique directly projects an image onto the retina of the user. However, in this technique, the position of the projected image is susceptible to the eye movement of the user.

With any of these techniques, the head mount display adopts an optical system having a high precision for the eye position of the user. For this reason, even when the eyes slightly go out of focus, the user feels great stress. It can be said that this stress is caused because the head mount display serves to show the user a virtual image, but is different from an optical system for showing the user a real image with light emitted from a display surface, as in a typical display apparatus.

The technique disclosed in Japanese Unexamined Patent Application Publication No. 2006-101561 allows the user to directly observe a real image with a small display terminal at hand. However, to obtain a desired image, the user takes, with a camera, an image of an object or a scene (hereinafter these will also be referred to as a real world) or of an image projected on a screen.

When a taken image is displayed on the head mount display, as disclosed in Japanese Unexamined Patent Application Publication No. 10-191288, the optical precision for the eye position of the user can be improved. Unfortunately, in this case, the image presented to the user is a taken picture, and therefore, the quality of the image is seriously lower than the real world. Thus, for example, an image viewable in the real world becomes unclear because of low resolution when displayed on the head mount display. Moreover, a time lag easily occurs between the motion in the real world and the display of the image. As a result, it is difficult for the user to search for a desired object in the real world.

In addition, the distance of the real world or the screen on which the image is projected is considerably different from the distance of the small display terminal held by the user. Therefore, when specifying a certain position in the real world or on the image projected on the screen, the eyes of the user are focused. However, since the eyes of the user are focused onto the screen of the small display terminal, it is difficult to obtain a precise distance.

Further, the head mount display worn on the user limits the viewing angle of the user, and causes discomfort for the head or ear of the user.

It is desirable to obtain information about a specific portion of a real world or an image projected on a screen without limiting the viewing angle.

An embodiment of the present invention receives an image of an object picked up by an image pickup device, and detects the viewpoint position of the user. Further, the embodiment of the present invention presents the image on a display device, and extracts, from the image, an area corresponding to an image frame of a display surface of the display device when the image is viewed through the display surface from the viewpoint position of the user, and supplies the extracted area to an image presenting unit.

This allows a specific portion extracted from the real world or an image projected on the screen to be presented. Thus, the user can acquire an image without causing a time lag until the image is displayed and degrading the image, and can operate the acquired image. The user also can closely observe the acquired image at the hand.

According to the embodiment of the present invention, when extracting a specific portion of the real world or the image projected onto the screen, the user can acquire a desired portion with a wide viewing angle including the peripheral vision. Hence, the user can easily acquire a desired image with a natural operation without feeling discomfort.

BRIEF DESCRIPTION OF THE DRAWINGS

FIG. 12 is a flowchart showing a procedure for forming a stereo image using stereo vision in the embodiment;

DESCRIPTION OF THE PREFERRED EMBODIMENTS

An embodiment of the present invention will be described below with reference to the attached drawings. An image processing system 1 according to this embodiment allows the user to acquire information contained in a scene in the real world, an image projected on a large screen, or an image presented by a large-screen display apparatus, while viewing the image.

Figure 1:
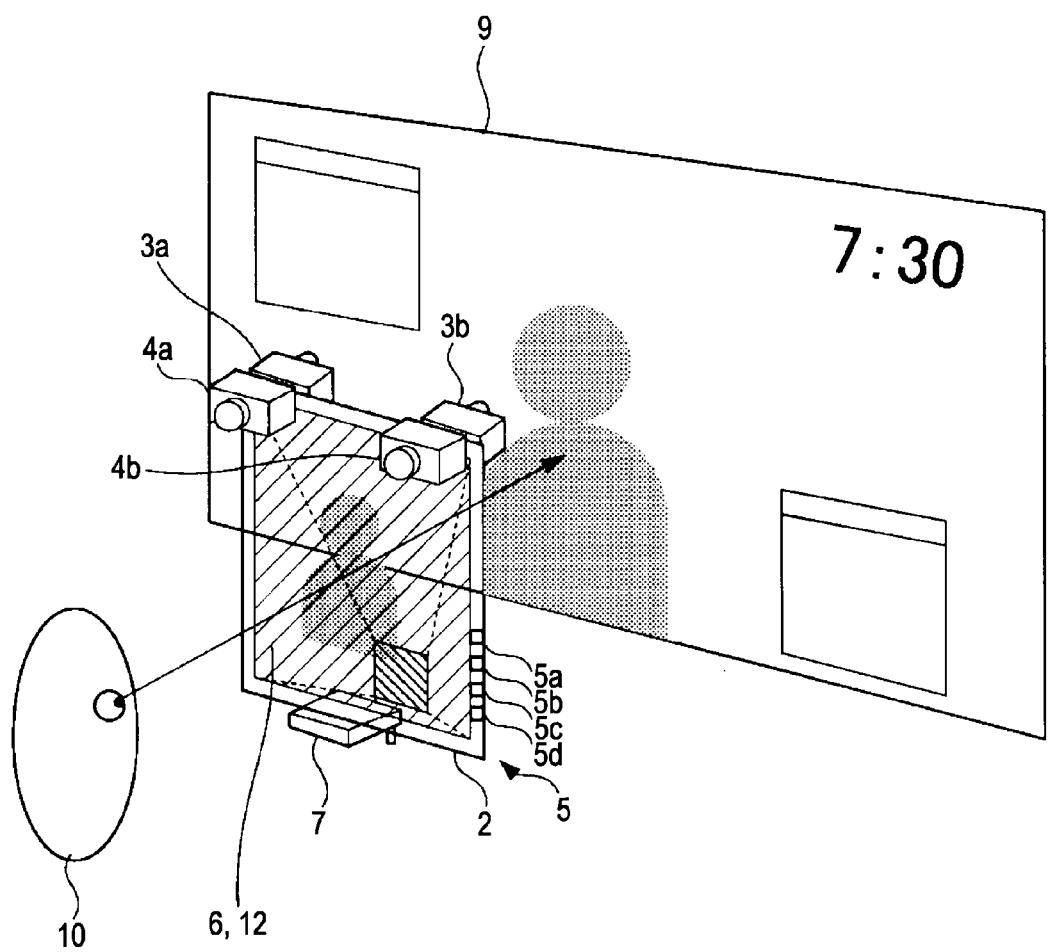
FIG. 1 is an explanatory view showing an external configuration of an image processing apparatus according to an embodiment of the present invention.

FIG. 1 shows a configuration of the image processing system 1 according to this embodiment.

The image processing system 1 includes a transmissive display device 2 on which various menus and images are displayed. The transmissive display device 2 serves as a display device to which an image is presented from an image presenting unit 7. The transmissive display device 2 has, on a display surface, a transmissive display panel 12 that can switch between a transmission state and a non-transmission state (diffused state) at an arbitrary timing. In this embodiment, for example, an UMU film (registered trademark) is bonded as the transmissive display panel 12. By the application of a predetermined voltage, switching is made between a transmissive state and a non-transmissive (diffused) state of the film. In a non-transmissive state, an image is presented on the transmissive display panel 12 by the image presenting unit 7 formed by a small projector. The image presented by the image presenting unit 7 is within the viewing angle of a user 10. When no image is projected by the image presenting unit 7, the transmissive display panel 12 is placed in a transmissive state.

When the transmissive display panel 12 is in a transmissive state, the user can view a real world (scene) behind the transmissive display device 2, an image projected on a large screen 9, or an image presented by a large-screen display apparatus, through the transmissive display panel 12. While the operation for an image projected on the screen 9 will be described below, this also applies to the real world.

Viewpoint-position cameras 4a and 4b are provided on one surface of the transmissive display device 2, and take images of the viewpoint of the user in order to detect a position where the user views the image (hereinafter also referred to as a viewpoint position). The viewpoint position is found by a viewpoint-position detecting unit 16, which will be described below, on the basis of images taken by the viewpoint-position cameras 4a and 4b. Here, the surface on which the viewpoint-position cameras 4a and 4b are provided is a front surface of the transmissive display device 2. On a back surface of the transmissive display device 2 (a surface opposite the viewpoint position of the user), eye cameras 3a and 3b are provided to take images of an image projected on the screen 9 at which the user 10 looks. The eye cameras 3a and 3b and the viewpoint-position cameras 4a and 4b are image pickup devices capable of picking up a still image or a motion image. The image pickup directions of the cameras move in association with the transmissive display device 2.

The eye cameras 3a and 3b and the viewpoint-position cameras 4a and 4b can be formed by infrared cameras for detecting the viewpoint of the user 10 by using infrared rays or distance measuring devices for detecting the viewpoint. Instead of being provided integrally with the transmissive display device 2, that is, of being attached to an outer frame of the transmissive display device 2, for example, the eye cameras 3a and 3b and the viewpoint-position cameras 4a and 4b may be mounted in the room where the user 10 is present.

A touch panel 6 is provided on the front surface of the transmissive display device 2, and the user 10 can operate the touch panel 6 with the touch thereof. The user 10 can directly touch portions corresponding to menus, images, and icons on a display surface of the touch panel 6 with a pointing device, such as a pen-shaped input device, or the finger of the user 10.

An operation unit 5 is provided on the outer frame of the transmissive display device 2 so that the user 10 can give various instructions through various buttons provided in the operation unit 5. In this embodiment, the operation unit 5 includes a viewpoint moving button 5a and a zoom button 5b. The viewpoint moving button 5a allows the user 10 to specify the direction when moving with the transmissive display device 2 in hand and when moving the viewpoint. The zoom button 5b is used to give instructions to zoom a portion the user wants to view more closely (to display an image in an enlarged or reduced size). An image acquisition button 5c is also provided on the outer frame, and allows the user 10 to give instructions to acquire a desired image. The operation unit 5 also includes a transmission-state switch button 5d and a touch-panel switch button (not shown). The transmission-state switch button 5d is used to switch between a transmissive state and a non-transmissive state of the transmissive display panel 12. The touch-panel switch button is used to cause the touch panel 6 to display menu icons and so on. Icons corresponding to these buttons may be displayed on the touch panel 6 so that the user 10 can touch the icons to perform a desired operation.

Figure 2:
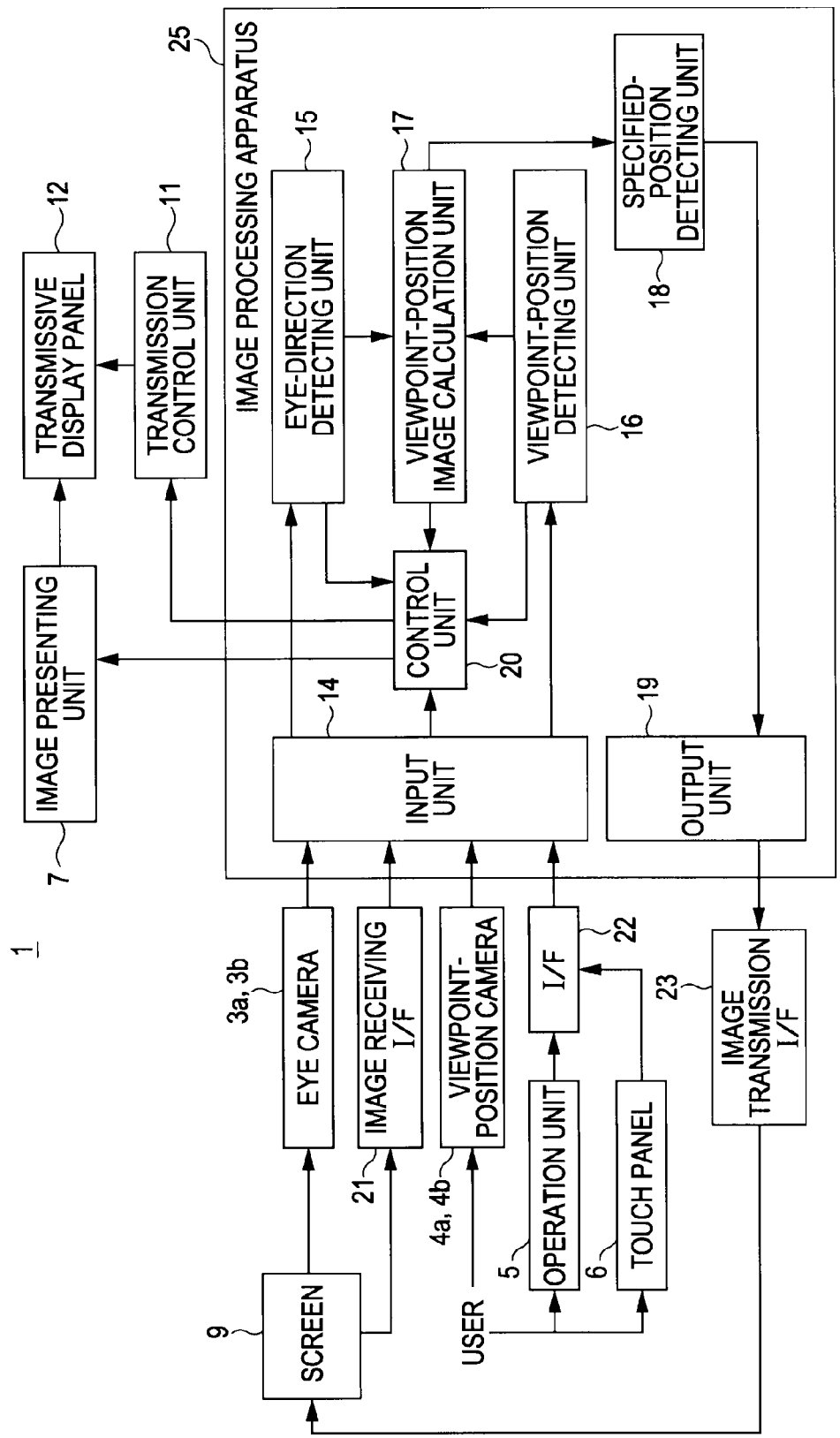
FIG. 2 is a block diagram showing an internal configuration of the image processing apparatus of the embodiment.

FIG. 2 shows an internal configuration of the image processing system 1.

The image processing system 1 includes a control unit 20 for controlling functional blocks, and is formed by, for example, a micro processing unit (MPU). The control unit 20 generates an image to be presented on the transmissive display panel 12 on the basis of the viewpoint position of the user 10 detected by a viewpoint-position detecting unit 16 and images taken by the eye cameras 3a and 3b. The generated image is supplied to the image presenting unit 7 corresponding to an image frame of the transmissive display panel 12 provided when viewed from the viewpoint position of the user 10 through the transmissive display panel 12.

An image processing apparatus 25 includes an input unit 14 to which images captured by the eye cameras 3a and 3b and the viewpoint-position cameras 4a and 4b are input. The image processing apparatus 25 also includes an eye-direction detecting unit 15 for detecting the eye direction of the user 10 on the basis of the images captured by the eye cameras 3*a* and 3*b*. The image processing apparatus 25 also includes a viewpoint-position detecting unit 16 for detecting, as a viewpoint position, the position of the user 10 (viewpoint) relative to the screen 9 on the basis of the images captured by the viewpoint-position cameras 4*a* and 4*b*.

The image processing apparatus 25 also includes a viewpoint-position image calculation unit 17 for generating an image to be presented on the transmissive display device 2. To the viewpoint-position image calculation unit 17, the eye direction of the user 10 detected by the eye-direction detecting unit 15, the viewpoint position of the user 10 detected by the viewpoint-position detecting unit 16, and the distance to the object (the distance between the transmissive display device 2 and the screen 9 in this embodiment) are input. The viewpoint-position image calculation unit 17 generates an image obtained when an image presented on the screen 9 is viewed from the viewpoint position of the user 10 through the transmissive display panel 12, on the basis of the input information. This image has a size such as to fit within the image frame of the transmissive display panel 12. The image processing apparatus 25 also includes a specified-position detecting unit 18 and an output unit 19. The specified-position detecting unit 18 detects, as a specified position, the coordinate position specified by the user 10 through the touch panel 6, and extracts an image portion at the specified position from the image generated by the viewpoint-position image calculation unit 17. The output unit 19 supplies this information to the touch panel 6.

The eye cameras 3*a* and 3*b* take images of an image projected on the screen 9, and supply generated image data to the input unit 14. An image projected on the screen 9, an image supplied from a tuner, or the like are input to the input unit 14 via an image receiving interface 21.

The viewpoint-position cameras 4*a* and 4*b* capture images of the viewpoint of the user 10, and supply generated image data to the input unit 14. When the touch panel 6 detects that the user 10 presses the panel surface, it generates operating information including information about the coordinate position of the pressed portion on the panel surface. The operating information also includes information for distinguishing among various buttons operated by the operation unit 5. The operating information is input to the input unit 14 via an interface 22. The control unit 20 transmits the image presented on the screen 9 and image data processed in accordance with the viewpoint position of the user 10 to the image presenting unit 7.

Various data supplied to the input unit 14 are supplied to the eye-direction detecting unit 15 for detecting an image taking position (image taking region) and the viewpoint-position detecting unit 16 for detecting the viewpoint position of the user 10.

The eye-direction detecting unit 15 detects a position where the user 10 takes an image of the image projected on the screen 9, on the basis of data obtained from the eye cameras 3*a* and 3*b*.

The viewpoint-position detecting unit 16 detects the position of the user 10 relative to the screen 9 (viewpoint position) on the basis of the data obtained from the viewpoint-position cameras 4*a* and 4*b*.

The viewpoint-position image calculation unit 17 performs predetermined calculation to find an image obtained when viewed from the viewpoint through the transmissive display panel 12.

The image at the viewpoint obtained by the viewpoint-position image calculation unit 17 is supplied to the specified-position detecting unit 18 that detects the position specified by the user 10 through the touch panel 6. The specified position detected by the specified-position detecting unit 18 is converted into a predetermined format by a transmission interface 23 via the output unit 19. Then, for example, a zoom image is displayed on the screen 9 as an image corresponding to the specified position.

The control unit 20 finds an area that is to be extracted from the image input to the input unit 14, on the basis of the viewpoint position of the user 10. The control unit 20 extracts an image in the eye direction of the user 10 detected by the eye-direction detecting unit 15, and supplies the image to the image presenting unit 7. Then, the control unit 20 supplies, to a transmission control unit 11, a command to switch between a transmissive state and a non-transmissive state of the transmissive display panel 12. When the transmissive display panel 12 is in a transmissive state, the control unit 20 supplies an image in the area extracted corresponding to the image frame of the transmissive display panel 12 to the image presenting unit 7.

The image presenting unit 7 presents an image on the transmissive display panel 12 in a non-transmissive sate. The control unit 20 extracts an image presented on the screen 9 via the transmissive display panel 12 only when the transmissive display panel 12 is in a transmissive state. The transmission control unit 11 for controlling switching between the transmissive state and the non-transmissive state of the transmissive display panel 12 is controlled by the transmission-state switch button 5*d* or a user interface (not shown) displayed on the transmissive display panel 12. The user interface includes, for example, an icon or a selection menu.

When the image presenting unit 7 projects an image onto the screen 9, the transmission control unit 11 switches the transmissive display panel 12 to a non-transmissive state. The operation of the image presenting unit 7 for presenting the image is operatively associated with the operation of the transmission control unit 11 for switching to the non-transmissive state. In other words, the transmissive display panel 12 is in a transmissive state before the user 10 acquires an image. When the user 10 presses the image acquisition button 5*c*, the transmissive display panel 12 is switched to a non-transmissive state by the control unit 20 so that an image can be acquired. When projection by the image presenting unit 7 is finished, the transmission control unit 11 switches the transmissive display panel 12 to a transmissive state.

Figure 3:
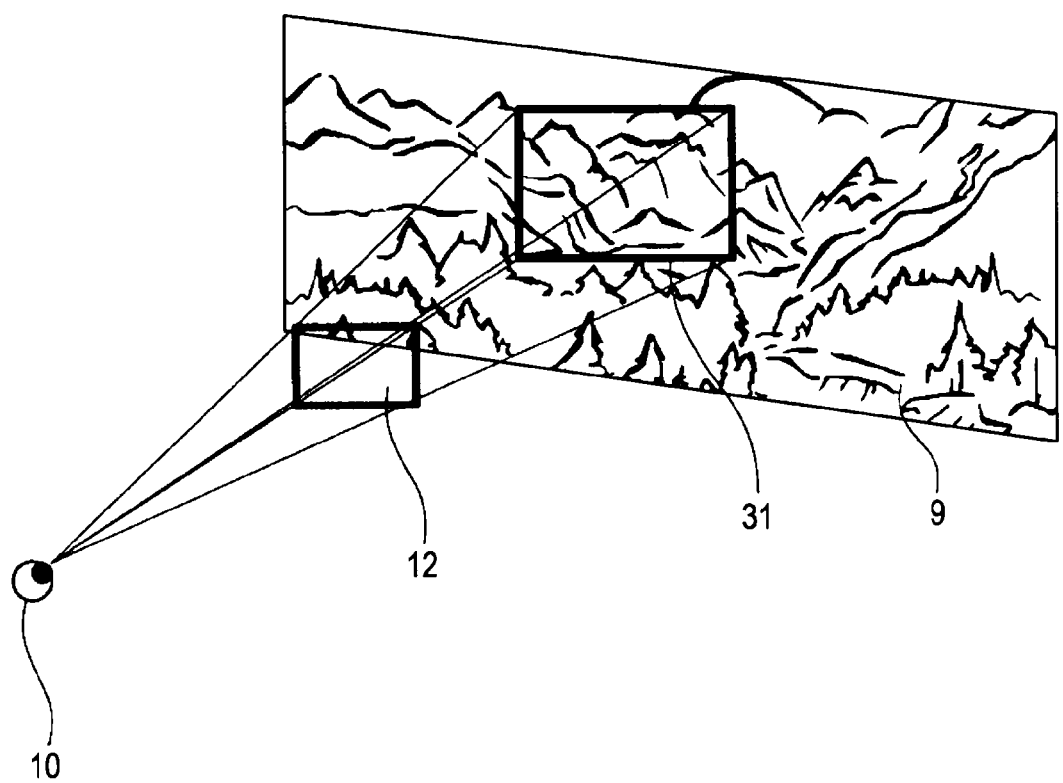
FIG. 3 is an explanatory view showing an example in which an image presented on a screen is acquired in the embodiment.

FIG. 3 shows a case in which an image projected on the screen 9 is viewed using the transmissive display device 2.

For example, the user 10 holds the transmissive display device 2 in hand, and watches an image projected on the screen 9 through the transmissive display panel 12 in a transmissive state. In this case, the user 10 sees a portion of the projected image corresponding to a region 31.

With the use of the transmissive display device 2 of this embodiment, a desired image can be obtained within the image field of the transmissive display panel 12 without deteriorating the quality of the image projected on the screen 9 and causing a time lag in the presentation time. There is a demand to acquire a scene outside the image frame of the transmissive display panel 12 in a state in which the transmissive display panel 12 is placed within the viewing angle of the user 10. In this case, the viewing angle for the image presented on the transmissive display panel 12 at the viewpoint position of the user 10 is smaller than the viewing angle for the object viewed from the same viewpoint through the display surface. Since the viewing angle of the user 10 is not limited, it is easy to see the surrounding scene by using the peripheral vision of the user 10. For this reason, the user 10 can naturally search the image projected on the screen 9 for a desired image portion to be displayed in a zoomed manner.

The human eyes see a real image and a virtual image in different manners.

Figure 4A:
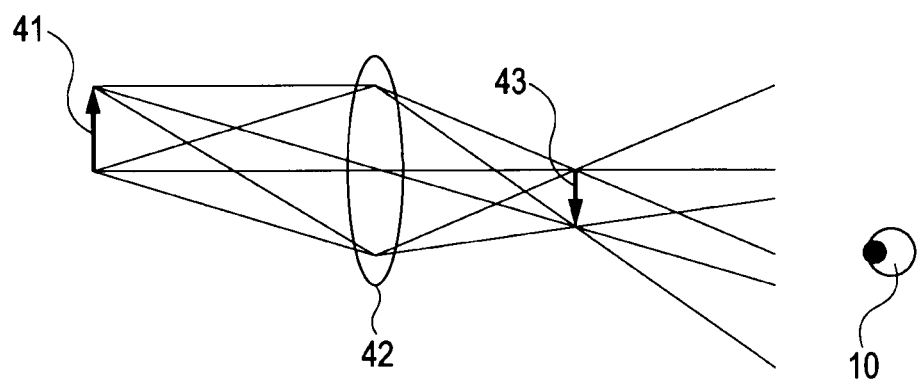
FIGS. 4A and 4B are explanatory views showing examples of a real image and a virtual image, respectively.
Figure 4B:
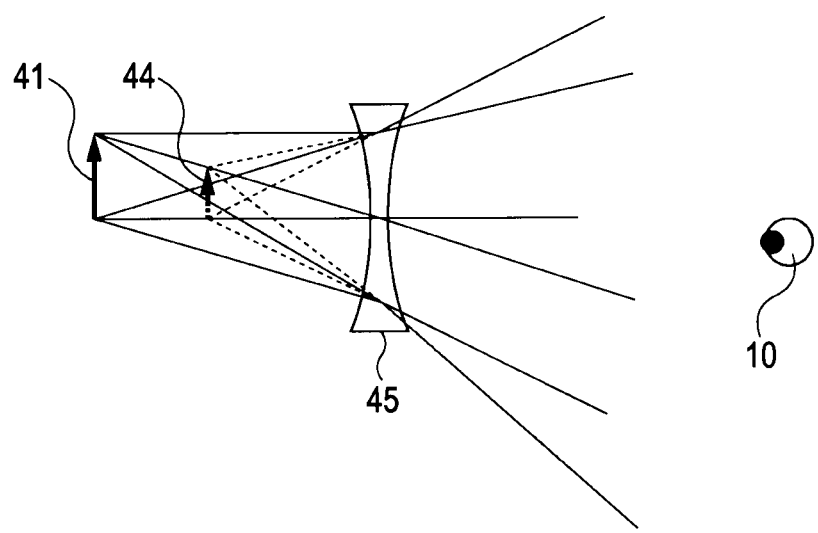

FIGS. 4A and 4B show how a real image and a virtual image are seen.

A description will now be given of how an object 41 is seen when a convex lens 42 or a concave lens 45 is interposed between the object 41 and the user 10.

FIG. 4A shows a light beam traveling when the convex lens 42 is used.

When seeing the object 41 via the convex lens 42, the user 10 sees a real image 43 of the object 41. The real image 43 is seen on the user side of the convex lens 42. In this embodiment, the transmissive display panel 12 is a real-image optical system.

FIG. 4B shows a light beam traveling when the concave lens 45 is used.

When seeing the object 41 via the concave lens 45, the user 10 sees a virtual image 44 of the object 41. The head mount display of the related art uses such a virtual-image optical system.

Figure 5A:
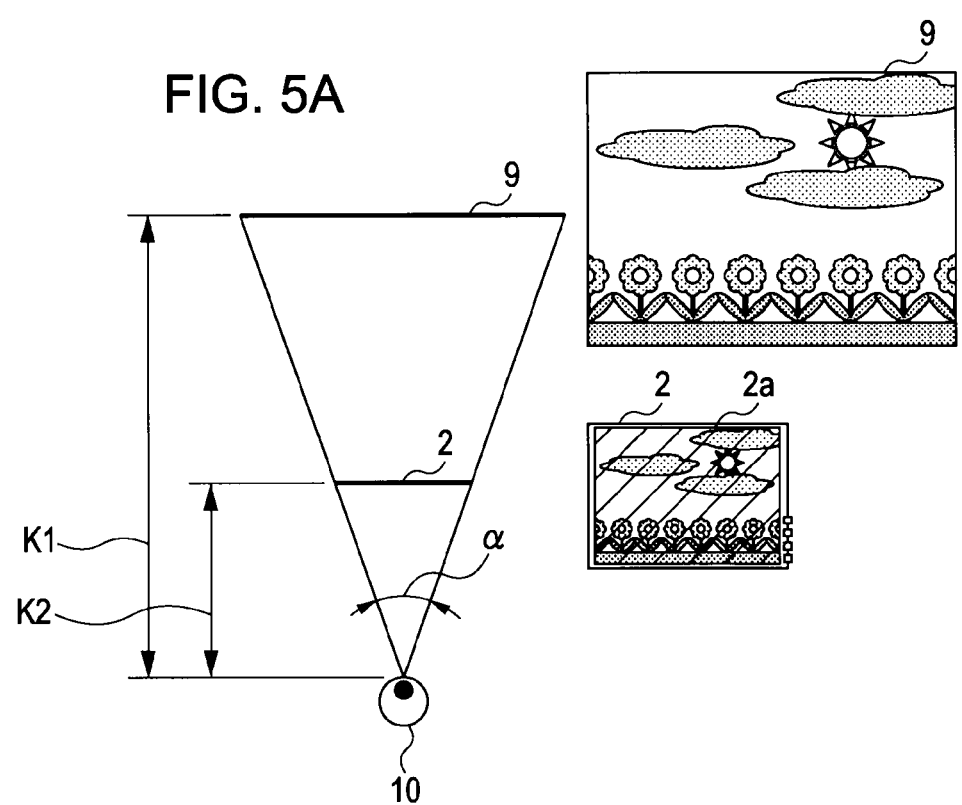
FIGS. 5A and 5B are explanatory views showing examples in which a part of an image, which is presented on a screen, is zoomed and presented on a transmissive display apparatus in the embodiment.
Figure 5B:
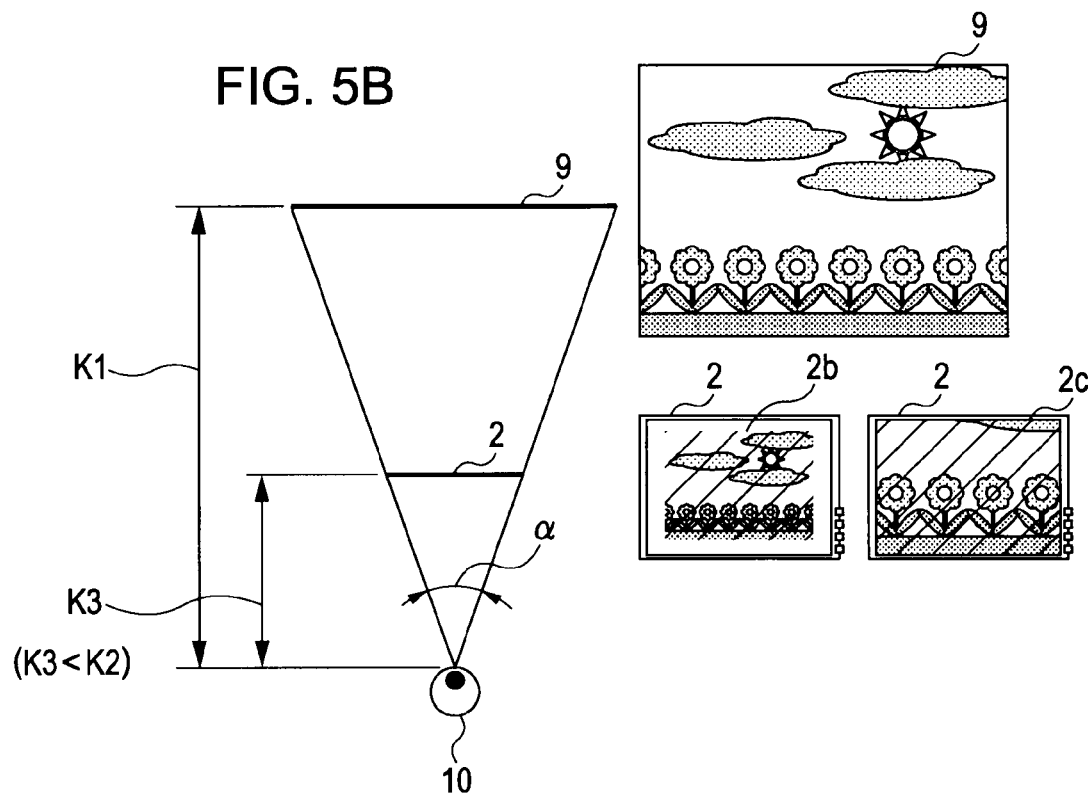

FIGS. 5A and 5B illustrate cases in which a part of an image presented on the transmissive display device 2 is zoomed and presented on the transmissive display panel 12.

FIG. 5A shows an example of an image presented on the transmissive display panel 12.

The distance between the viewpoint of the user 10 and the screen 9 is set at K1 and the distance between the viewpoint of the user 10 and the transmissive display device 2 is set at K2. When the outer frame of the transmissive display device 2 is fitted within the viewing angle α of the user 10 directly facing the screen 9, an image portion 2a of an image presented on the screen 9 within the viewing angle α is presented on the transmissive display panel 12.

FIG. 5B shows an example of an image presented on the transmissive display panel 12 when the transmissive display device 2 is placed closer to the user 10 than in the case shown in FIG. 5A.

In this case, the distance K3 between the viewpoint of the user 10 and the transmissive display device 2 is shorter than the above-described distance K2, and the distance between the screen 9 and the user 10 is equal to the distance K1 set in the case shown in FIG. 5A. An image portion 2b within the same viewing angle α as that of the image presented on the screen 9 is presented in a smaller size than the image portion 2a shown in FIG. 5A.

It is thought that, when getting interested in a portion of the presented image, the user moves the transmissive display device 2 closer to the user's face in order to more closely view the image portion. For this reason, when the user 10 specifies a part of the image presented on the transmissive display panel 12 or moves the face closer to the transmissive display panel 12, for example, it is preferable that the image portion (flowers in this embodiment) be enlarged, like an image 2c. To this end, when the user 10 moves the face closer to the transmissive display device 2 or specifies a portion of the image, the zoom ratio of the image presented on the transmissive display panel 12 is changed in this embodiment. This operation allows the user 10 to intuitively use the transmissive display device 2.

In the operation of changing the zoom ratio of the image, if the viewing angle of the image presented on the screen 9 is equal to that of the transmissive display device 2 when the user 10 moves the face close to the transmissive display device 2, the eye movement of the user 10 is detected. Further, to enlarge an image portion toward which the face of the user 10 is moved, the motion of the user 10 is detected.

FIGS. 6A to 6D show cases in which a part of an image presented on the transmissive display panel 12 is enlarged.

Figure 6A:
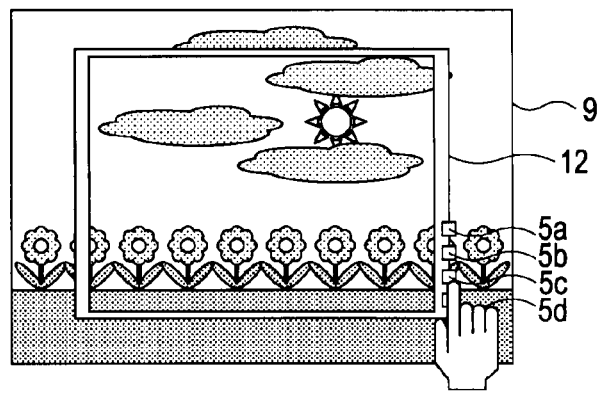
FIGS. 6A to 6D are explanatory views showing examples in which a part of an image, which is presented on the screen, is zoomed and presented on the transmissive display apparatus in the embodiment.

FIG. 6A shows an example in which the user 10 presses the image acquisition button 5c.

In this case, the transmissive display panel 12 is in a transmissive state, and the user 10 can view the image on the screen 9, through the transmissive display panel 12.

Figure 6B:
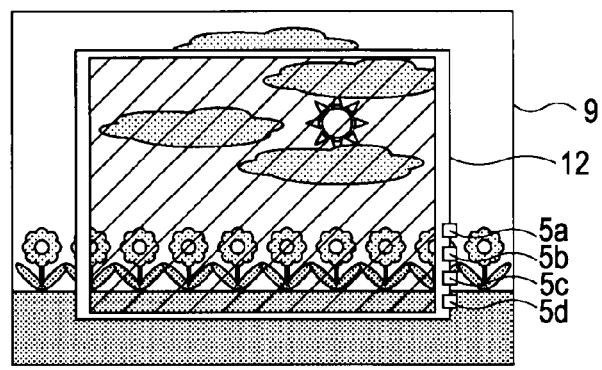

FIG. 6B shows an example of a presented image.

In this case, the transmissive display panel 12 is in a non-transmissive state. On the transmissive display panel 12, an image captured from the screen 9 by the image presenting unit 7 is displayed.

Figure 6C:
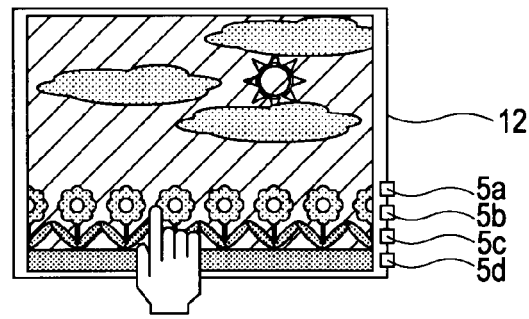

FIG. 6C shows an example in which the user 10 presses the zoom button 5b.

A position specified by the user 10 for zooming is detected by the touch panel 6. Then, an image at the specified position is enlarged by pressing the zoom button 5b.

Figure 6D:
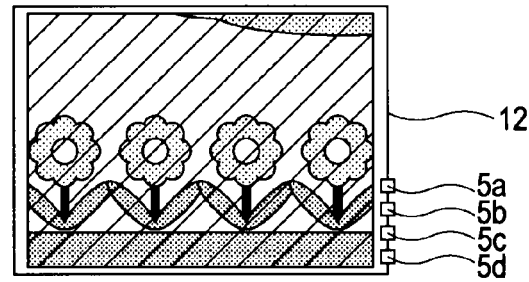

FIG. 6D shows an example of an enlarged presented image.

The user 10 can closely view the enlarged image portion corresponding to the specified position on the image presented on the transmissive display panel 12.

FIGS. 7A to 7D show cases in which the user 10 enlarges a part of an image presented on the transmissive display panel 12 while moving the viewpoint.

Figure 7A:
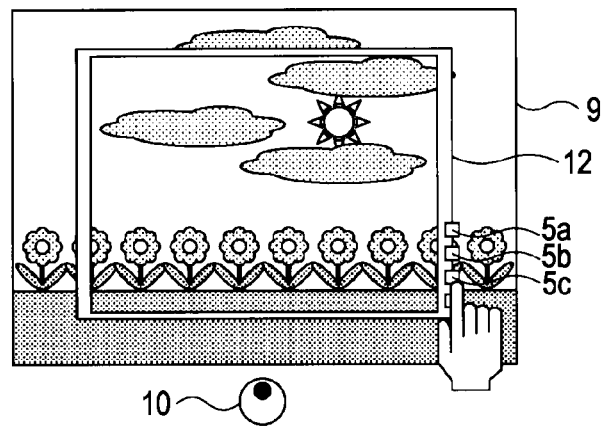
FIGS. 7A to 7D are explanatory views showing examples in which a part of an image, which is presented on a screen, is zoomed and presented on a transmissive display apparatus while the user moves the viewpoint in the embodiment.

FIG. 7A shows an example in which the user 10 presses the image acquisition button 5c.

In this case, the transmissive display panel 12 is in a transmissive state, and an image on the screen 9 is transmitted and displayed on the transmissive display panel 12.

Figure 7B:
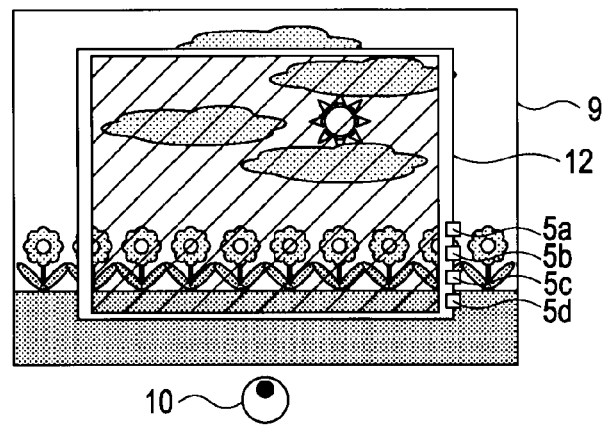

FIG. 7B shows an example of a presented image.

In this case, the transmissive display panel 12 is in a non-transmissive state. The user 10 can view the image on the screen 9 through the transmissive display panel 12.

Figure 7C:
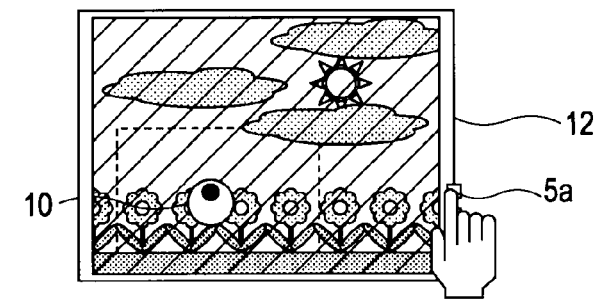

FIG. 7C shows an example in which the user 10 moves the viewpoint while pressing the viewpoint moving button 5a. Here, it is assumed that the user 10 pays attention to a left part of the image.

In this case, when the user 10 moves the transmissive display device 2 close to the user's face while pressing the viewpoint moving button 5a, a position of the moved viewpoint of the user 10 is calculated. When the user 10 then presses the zoom button 5b, an image portion at the position toward the user's face is moved (a portion enclosed by a broken line in FIG. 7C) is enlarged and presented on the transmissive display panel 12.

Figure 7D:
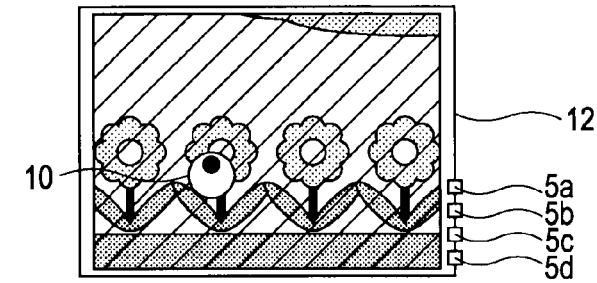

FIG. 7D shows an example of an enlarged presented image.

When moving from the front center of the transmissive display panel 12 to the left, the user 10 can closely view an enlarged portion at the moved viewpoint, of the image presented on the transmissive display panel 12.

Figure 8:
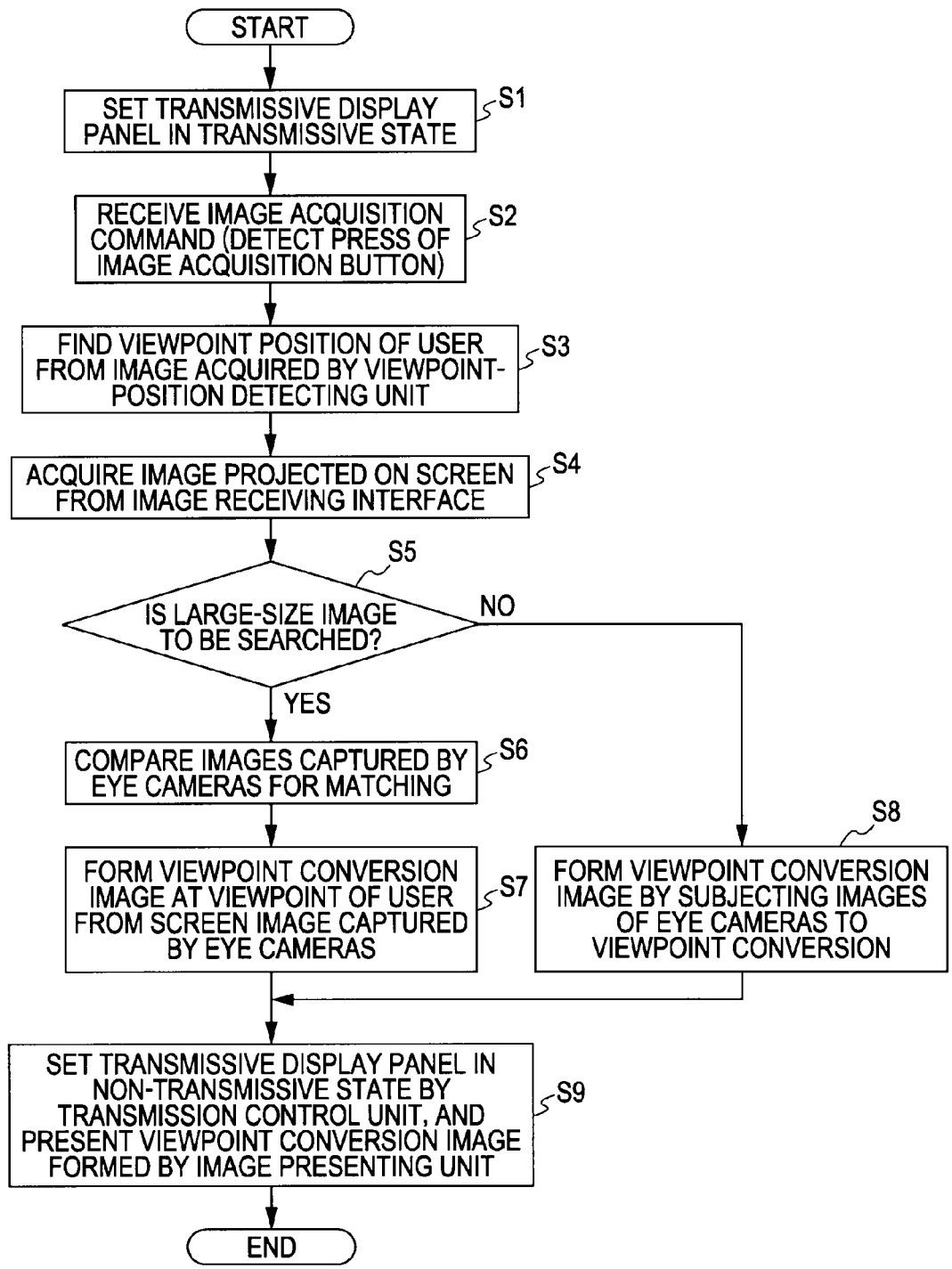
FIG. 8 is a flowchart showing a procedure for acquiring an image in the embodiment.

FIG. 8 shows a procedure for presenting an image in accordance with the position on the touch panel 6 pressed by the user 10. The control unit 20 detects the position of an object close to the touch panel 6. In this embodiment, the viewpoint position of the user 10 is detected on the basis of images taken by the two viewpoint-position cameras 4a and 4b. The distance between the viewpoint-position cameras 4a and 4b can be arbitrarily set beforehand.

In an initial state, the transmission control unit 11 sets the transmissive display panel 12 in a transmissive state (Step S1). In the transmissive state, the user 10 can view an image presented on the screen 9 through the transmissive section. While freely moving the transmissive display device 2, the user 10 presses the image acquisition button 5c at a position on the screen 9 corresponding to a desired object in order to closely view the desired object. In this case, the control unit 20 receives an image acquisition command generated by the press of the image acquisition button 5*c* (Step S2).

Next, the viewpoint-position detecting unit 17 detects a viewpoint position of the user 10 on the basis of data obtained from the viewpoint-position cameras 4*a* and 4*b* (Step S3). The viewpoint-position detecting unit 17 can detect the positions of the eyes on the basis of images of the face of the user 10 taken by the viewpoint-position cameras 4*a* and 4*b* by an existing face recognition technique. By using the positions of the eyes contained in the images of the user 10 taken by the viewpoint-position cameras 4*a* and 4*b*, three-dimensional coordinates of the eyes (viewpoint) can be found. Instead of using the viewpoint-position cameras 4*a* and 4*b*, a distance measuring device or an infrared sensor may be used, or the viewpoint may be virtually placed on the axis passing through the center of the display.

To acquire an image seen at the viewpoint position of the user 10, an image projected on the screen 9 is acquired from the image receiving interface 21 and the image transmission interface 23 (Step S4).

If original data on the image presented on the screen 9 can be received, it can be used subsequently. The original data can be processed as an image finer than when an image of the image presented on the screen 9 is taken. When it is difficult to receive original data on the image, processing is performed using the images taken by the eye cameras 3*a* and 3*b*. When the image presented on the screen 9 can be received, it is subjected to matching with the images taken by the eye cameras 3*a* and 3*b*.

For example, image matching is performed by any of the following two methods:

(1) The zoom ratio is roughly calculated by finding the distance between the eye cameras 3*a* and 3*b* and the screen 9 from the focal position of the eye cameras 3*a* and 3*b*, and block matching is then performed.

(2) Detection is performed using correlation while the zoom ratio is not fixed (an FFT-Based Technique for Translation, Rotation, and Scale-Invariant Image Registration [IEEE 1996]).

The eye-direction detecting unit 15 determines whether to search the image projected on the screen 9 in order to detect whether the projected image is included in the image downloaded via the image receiving interface 21 (Step S5). When the image projected on the screen 9 is searched, it is compared with the images taken by the eye cameras 3*a* and 3*b* for the purpose of matching (Step S6).

In Steps S5 and S6, the image projected on the screen 9 is downloaded via the image receiving interface 21 and utilized. In this processing, matching between the images taken by the eye cameras 3*a* and 3*b* and the downloaded image is performed to certify whether or not the taken images are included in the downloaded image. When the image presented on the screen 9 is directly downloaded and used, it is normally possible to present a high-resolution image on the transmissive display panel 12. When the taken images are not included in the image downloaded via the image receiving interface 21, subsequent steps are performed.

Then, a viewpoint conversion image at the viewpoint position of the user 10 is formed on the basis of the images of the image projected on the screen 9 taken by the eye cameras 3*a* and 3*b* (Step S7).

A viewpoint conversion image refers to a combination of an image projected on the screen 9 and an image the user 10 sees through the transmissive display device 2. For example, when the user 10 sees the screen 9 obliquely, an image viewed on the transmissive display device 2 is inclined because it is not viewed from the front. Consequently, the image on the transmissive display device 2 is different in shape from the image projected on the screen 9. Processing for forming an image corrected for such deformation is referred to as "viewpoint conversion". Further, an image formed by viewpoint conversion is referred to as a "viewpoint conversion image". When the image acquired by the user 10 is projected onto the screen 9 again and then the user 10 acquires the projected image again, the quality of the acquired image deteriorates seriously. This deterioration of the image quality can be minimized by forming a viewpoint conversion image at the viewpoint position of the user 10 in the image processing apparatus 25. However, when the image presented on the screen 9 can be used as it is, formation of the viewpoint conversion image can be omitted.

The viewpoint-position image calculation unit 17 forms a viewpoint conversion image in accordance with the viewpoint position of the user 10 detected by the viewpoint-position detecting unit 16. A two-dimensional image can be subjected to viewpoint conversion by affine transformation. By using images taken by two or more eye cameras, a stereoscopic image can be reconstructed by matching using stereo vision.

In contrast, when the image projected on the screen 9 is not searched, a viewpoint conversion image is formed by subjecting images taken by the eye cameras 3*a* and 3*b* to viewpoint conversion (Step S8).

After Step S7 or S8, the transmission control unit 11 switches the transmissive display panel 12 to a non-transmissive state. Then, the viewpoint conversion image is presented on the transmissive display panel 12 by the image presenting unit 7 (Step S9). In this case, the image to be viewed by the user 10 is presented on the transmissive display panel 12.

Figure 9:
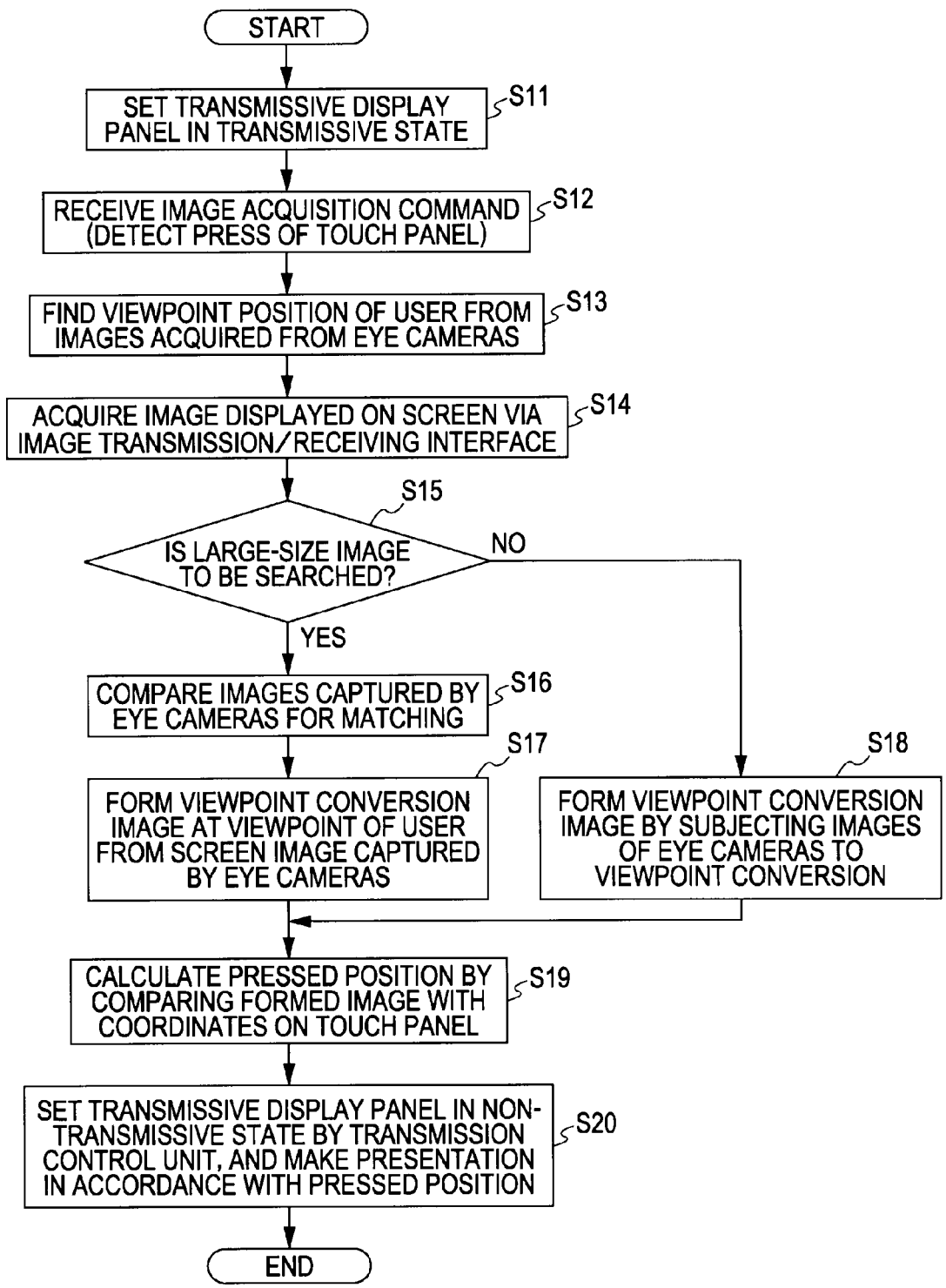
FIG. 9 is a flowchart showing a procedure for acquiring an image at a position specified through a touch panel in the embodiment.

FIG. 9 shows a procedure for specifying a position in the displayed image with the touch panel 6.

In an initial state, the transmission control unit 11 sets the transmissive display panel 12 in a transmissive state (Step S11). In a transmissive state, the user 10 can view an image projected on the screen 9, through the transmissive section. The user 10 freely moves the transmissive display device 2, and presses a portion of the touch panel 6 corresponding to a desired object on the screen 9 in order to closely view the desired object. In this case, the control unit 20 receives information about the specified position on the touch panel 6 touched with the finger of the user 10 and an image acquisition command from the touch panel 6 (Step S12).

Next, the viewpoint-position detecting unit 17 detects a viewpoint position of the user 10 on the basis of data obtained from the viewpoint-position cameras 4*a* and 4*b* (Step S13). The viewpoint-position detecting unit 17 can detect the positions of the eyes from images of the face of the user 10 taken by the viewpoint-position cameras 4*a* and 4*b* by the existing face recognition technique. By using the positions of the eyes included in the image of the user 10 taken by the viewpoint-position cameras 4*a* and 4*b*, three-dimensional coordinates of the eyes (viewpoint) can be obtained. Instead of using the viewpoint-position cameras 4*a* and 4*b*, a distance measuring device or an infrared sensor may be used, or the viewpoint may be virtually placed on the axis passing through the center of the display.

To acquire an image seen from the viewpoint position of the user 10, an image projected on the screen 9 is acquired from the image receiving interface 21 and the image transmission interface 23 (Step S14).

If data on an image projected on the screen 9 can be received, the image is subsequently processed as a finer image. If it is difficult to receive the image, processing is performed with images taken by the eye cameras 3a and 3b. When the image projected on the screen 9 can be received, it is subjected to matching with the images taken by the eye cameras 3a and 3b.

The eye-direction detecting unit 15 determines whether to search the image projected on the screen 9 in order to detect whether the projected image is included in the image downloaded via the image receiving interface 21 (Step S15). When the image projected on the screen 9 is searched, it is compared with the images taken by the eye cameras 3a and 3b for the purpose of matching (Step S16).

When the image projected on the screen 9 is searched, it is compared with the image captured by the eye cameras 3a and 3b for the purpose of matching (Step S16).

Then, a viewpoint conversion image at the viewpoint position of the user 10 is formed on the basis of the images of the image projected on the screen 9, which are taken by the eye cameras 3a and 3b (Step S17). In this case, a viewpoint conversion image is formed in accordance with the viewpoint position of the user 10 obtained by the viewpoint-position cameras 4a and 4b. A two-dimensional image can be subjected to viewpoint conversion by affine transformation. By using the images taken by two or more eye cameras, a stereoscopic image can be reconstructed by stereo matching.

In contrast, when the image projected on the screen 9 is not searched, a viewpoint conversion image is formed by subjecting the images taken by the eye cameras 3a and 3b to viewpoint conversion (Step S18).

After Step S17 or S18, the specified-position detecting unit 18 compares the formed viewpoint conversion image with the coordinates on the touch panel 6, and calculates the position on the touch panel 6 pressed by the user 10 (Step S19). By matching between the formed viewpoint conversion image and the position on the touch panel 6, the viewpoint-position detecting unit 18 can detect which portion of the image is specified by the user 10.

After Step S19, the transmission control unit 11 switches the transmissive display panel 12 to a non-transmissive state. Then, the formed viewpoint conversion image is presented on the transmissive display panel 12 by the image presenting unit 7 (Step S20). In this case, the image to be viewed by the user 10 is presented on the transmissive display panel 12.

For example, it is conceivable to display a character in a portion on the transmissive display panel 12 specified by the user 10 and to enlarge the image centered on the character. Such an operation of presenting the image in accordance with the motion of the user 10 is preset as a user interface function. In this case, when the image is continuously enlarged from the formed viewpoint conversion image, the user 10 can intuitively recognize the image.

Positional information about the image projected on the screen 9 is calculated from the position on the touch panel 6 specified by the user 10, and is reflected into the projected image. This allows a plurality of persons to share and recognize presented information while viewing the same screen 9.

A procedure for forming a three-dimensional image by stereo vision will now be described with reference to FIGS. 10 to 12. This procedure is performed to measure the distance from the viewpoint position of the user 10 to the object.

FIGS. 10 and 11A to 11C show cases in which the viewpoint of the user 10 moves when taking images of three three-dimensional objects 46a to 46c, which are arranged in the real world, by the eye cameras 3a and 3b. These figures are taken, as viewed from above the display device 2 and the screen 9.

Figure 10:
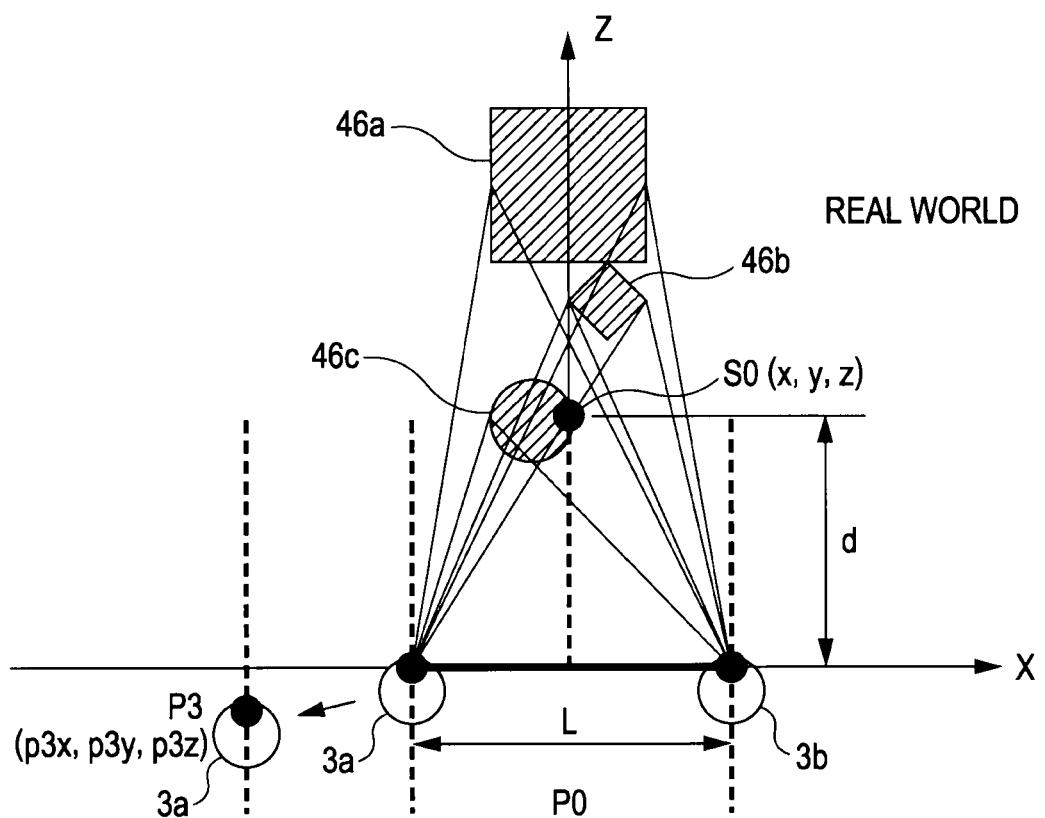
FIG. 10 is an explanatory view showing a method of measuring an object distance using stereo vision in the embodiment.

FIG. 10 shows an example in which images of the three objects 46a to 46c are taken by the eye cameras 3a and 3b which are arranged at a viewpoint position P0.

The coordinate position of the object 46c in a three-dimensional space is represented by S0 (x, y, z). The distance between the eye cameras 3a and 3b is represented as an inter-camera distance L, and the distance from the eye cameras 3a and 3b to the object 46c is represented as an object distance d. The viewpoint position P0 refers to a position where the eye cameras 3a and 3b point toward the objects 46a to 46c so that the center of the object 46a is placed on the normal to the segment shown by the inter-camera distance L.

A case in which the viewpoint of the user 10 is moved to a new viewpoint position P3 will be examined below. A description of the eye camera 3b at the viewpoint position P3 is omitted for concise explanation.

Figure 11A:
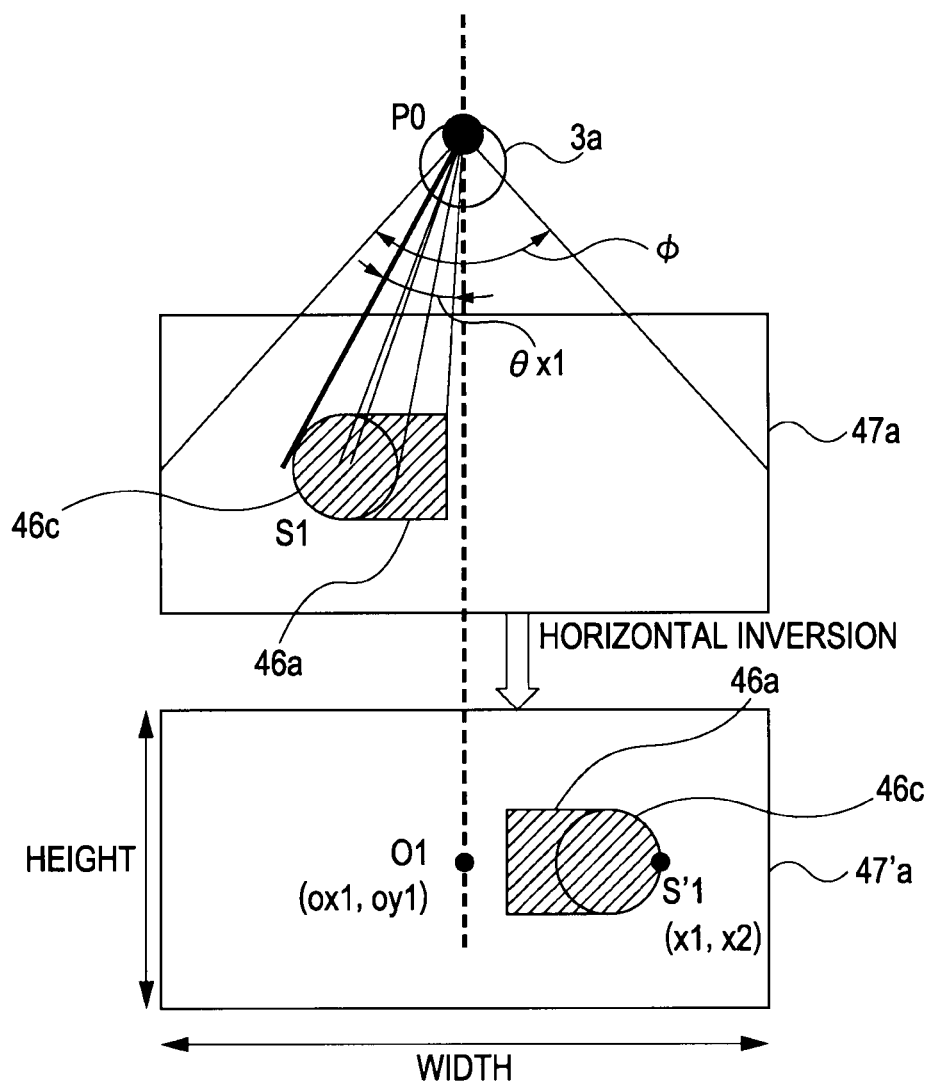
FIGS. 11A to 11C are explanatory views showing a method of measuring an object distance using stereo vision in the embodiment.

FIG. 11A shows an example in which an image 47a taken by the eye camera 3a at the viewpoint position P0 is processed. The eye-direction detecting unit 15 (see FIG. 2) forms an image 47'a by horizontally inverting the image 47a.

Figure 11B:
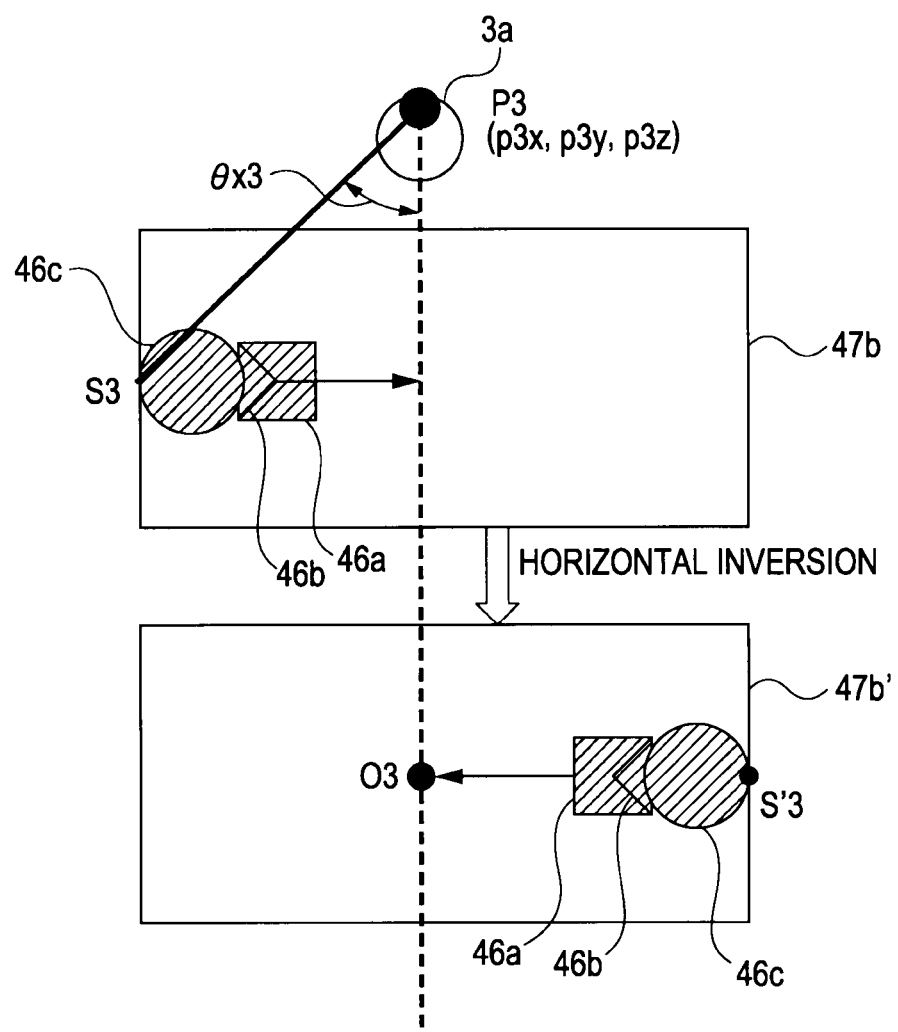

FIG. 11B shows an example in which an image 47b taken by the eye camera 3a at the viewpoint position P3 is processed. The eye-direction detecting unit 15 forms an image 47'b by horizontally inverting the image 47b.

Figure 11C:
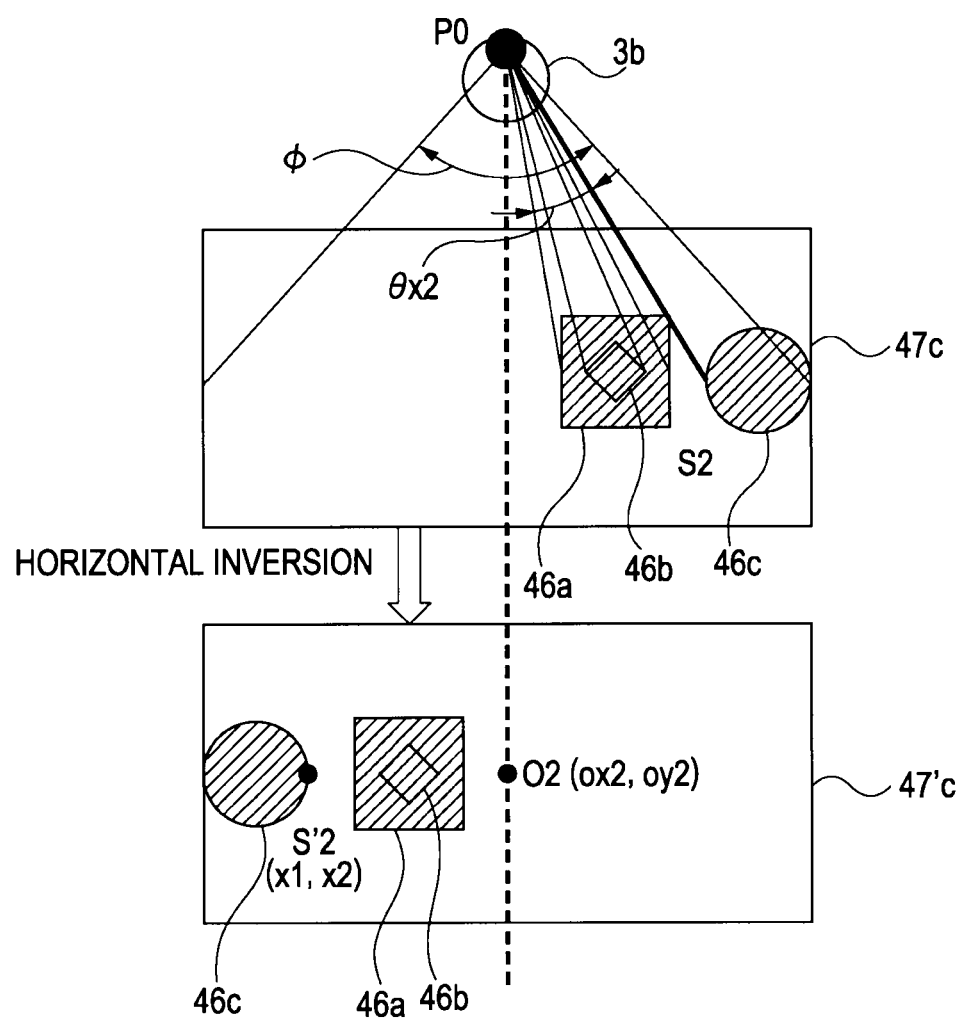

FIG. 11C shows an example in which an image 47c taken by the eye camera 3a at the viewpoint position P0 is processed. The eye-direction detecting unit 15 forms an image 47'c by horizontally inverting the image 47c.

FIG. 12 is a flowchart showing a procedure for performing processing when the viewpoint is moved.

Referring to FIGS. 11 and 12, a description will now be given of images taken by the eye cameras 3a and 3b when the user 10 moves the viewpoint leftward from a position directly facing the objects 46a to 46c to the viewpoint position P3.

First, the eye-direction detecting unit 15 finds a point S'2 (x1, x2) corresponding to a point S'1 (x1, x2) by block matching (Step S31). The points S'1 and S'2 are present at the coordinates obtained by horizontally inverting points S1 and S2.

Then, angles θx1 and θx2 of the points S'1 and S'2 are found (Step S32). As shown in FIG. 11, the angles θx1 and θx2 are equal to the angles of the points S1 and S2. The angles θx1 and θx2 can be given by the following Expressions (1) and (2):

$$\tan(\theta_{x1}) = -\frac{\tan(\phi/2) \cdot (x1 - ox1)}{\text{width}/2} \quad (1)$$

$$\tan(\theta_{x2}) = -\frac{\tan(\phi/2) \cdot (x2 - ox2)}{\text{width}/2} \quad (2)$$

where φ represents the camera angle of view, width and height represent the pixel numbers of the camera, and O1(ox1, oy1) and O2(ox2, oy2) represent the center coordinates.

Next, the object distance d to the point S0 (x, y, z) is found from the angles θx1 and θx2 and the position of the eye cameras 3a and 3b. The object distance d is given by the following Expression (3):

$$d = -\frac{L}{-\tan(\theta_{x1}) + \tan(\theta_{x2})} \quad (3)$$

Since angles θy1 and θy2 in the Y-axis direction are similarly found, the three-dimensional position (x, y, z) of the point S0 is found from the above values (Step S33). The three-dimensional position (x, y, z) is given by the following Expression (4):

$$x = L/2 - d \cdot \tan(\theta_{x1})$$

$$y = L/2 - d \cdot \tan(\theta_{y1})$$

$$Z = d \qquad (4)$$

Further, angles θx3 and θy3 are found from the coordinates (p3x, p3y, p3z) of the new viewpoint position P3. The angles θx3 and θy3 are given by the following Expression (5):

$$\tan(\theta_{x3}) = \frac{x - p3x}{z - p3z} \qquad (5)$$

$$\tan(\theta_{y3}) = \frac{y - p3y}{z - p3z}$$

For this reason, the coordinates of the points S3 and S'3 are found from the camera angle of view φ (Step S34). The coordinates of the points S3 and S'3 are given by the following Expressions (6) and (7):

$$x3 = ox3 - \frac{\tan(\theta \times 3) \cdot (\text{width}/2)}{\tan(\phi/2)} \qquad (6)$$

$$y3 = oy3 - \frac{\tan(\theta y3) \cdot (\text{height}/2)}{\tan(\phi/2)} \qquad (7)$$

Next, operations of zooming and shifting for an image acquired by the transmissive display device 2 performed when the user 10 moves the viewpoint position will be described with reference to FIGS. 13 and 14. The term "zooming" is to enlarge the image acquired by the transmissive display device 2. On the other hand, the term "shifting" is to move the target to be viewed by the user 10. These operations reflect the intuitive motion of the user 10 caused when the viewpoint is moved.

Figure 13:
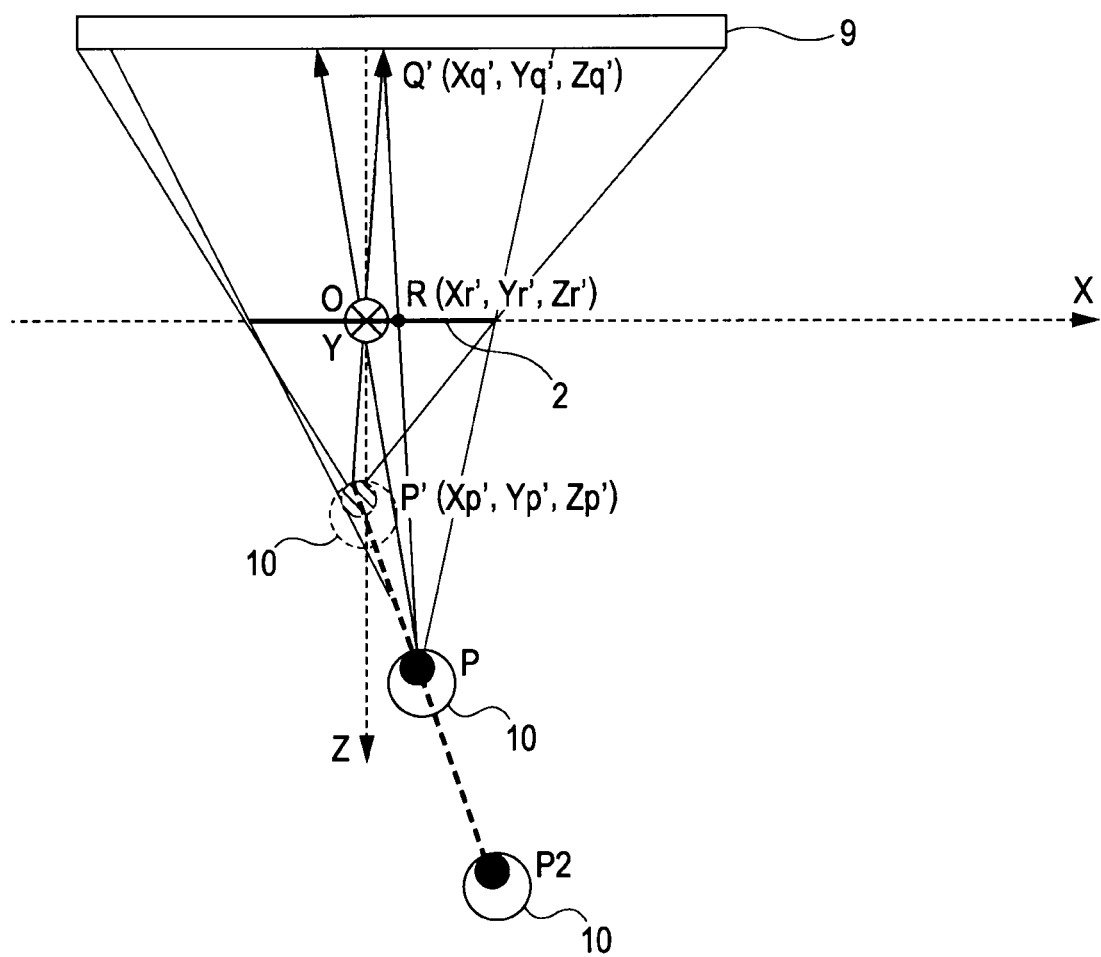
FIG. 13 is an explanatory view showing an example in which the viewpoint is moved in the embodiment.

FIG. 13 is a top view of the display device 2, as viewed from above the screen 9, and shows a case in which the user 10 moves the viewpoint.

The viewpoint of the user 10 provided when an image is acquired or when the user 10 presses the viewpoint moving button 5a is designated as a reference viewpoint position P'(Xp', Yp', Zp'). The coordinates on the screen 9 ahead of the line of sight of the user 10 watching the center point O of the transmissive display device 2 is designated as a coordinate point Q'(xq', Yq', Zq').

A new viewpoint is designated as P. When viewing the coordinate point Q' from the viewpoint P, an intersection on the transmissive display panel 12 is designated as R(Xr', Yr', Zr'). The amount (Xr', Yr') by which the image should be moved (hereinafter also referred to as "shift amount") is found from the difference between the center point O and the intersection R.

In this case, a zoom ratio (Zp'−Zq')/(Zp−Zq') is found from a distance (Zp−Zq') in the Z-direction between the coordinate point Q' and the reference viewpoint position P' and a distance (Zp−Zq') in the Z-direction between the coordinate point Q' and the viewpoint P. From the above, the shift amount and the zoom ratio can be calculated.

By multiplying the shift amount and the zoom ratio by a predetermined viewpoint moving parameter (e.g., 1.5 or 2.0), the motion of the user 10 can be emphasized.

The viewpoint moving parameter will now be described.

The distance by which the user 10 actually moves the viewpoint is found as the distance from the reference viewpoint P' to the viewpoint P. When it is assumed that the user 10 moves the viewpoint to a position to which the user 10 does actually not move the viewpoint, this position is defined as a virtual viewpoint P2. The virtual viewpoint P2 is found by setting a viewpoint moving parameter for the distance by which the user 10 actually moves the viewpoint (the distance from the reference viewpoint P' to the viewpoint P). For example, when the viewpoint moving parameter is set at two, the virtual viewpoint P2 is found by multiplying the actual moving distance by two.

Further, "emphasis on the motion of the user 10" will be described. First, it is assumed that the user 10 moves the face close to the transmissive display device 2 or moves the transmissive display device 2 in the right-left direction. In this case, the image frame of an image the user views through the transmissive display panel 12 coincides with the periphery of the image presented on the screen 9, and the user is going to further enlarge a part of the image presented on the transmissive display panel 12. In the related art, when the user 10 moves the face close to the transmissive display panel 12, a scene around the screen 9 is also displayed, a desired image to be viewed becomes small (see FIG. 5B). This reduces usability.

Accordingly, when the image processing system 1 detects that the user 10 moves the face close to the transmissive display panel 12 or moves the transmissive display device 2 to the left, it understands that an operation of "presenting the image at an increased zoom ratio" or of "presenting a left image" is performed. When the distance by which the user 10 moves the viewpoint is designated as a unit moving distance, the image processing system 1 multiplies the unit moving distance by a parameter of two or three, thus increasing the moving distance of the viewpoint, and presents an enlarged image or a left image on the transmissive display panel 12.

Figure 14:
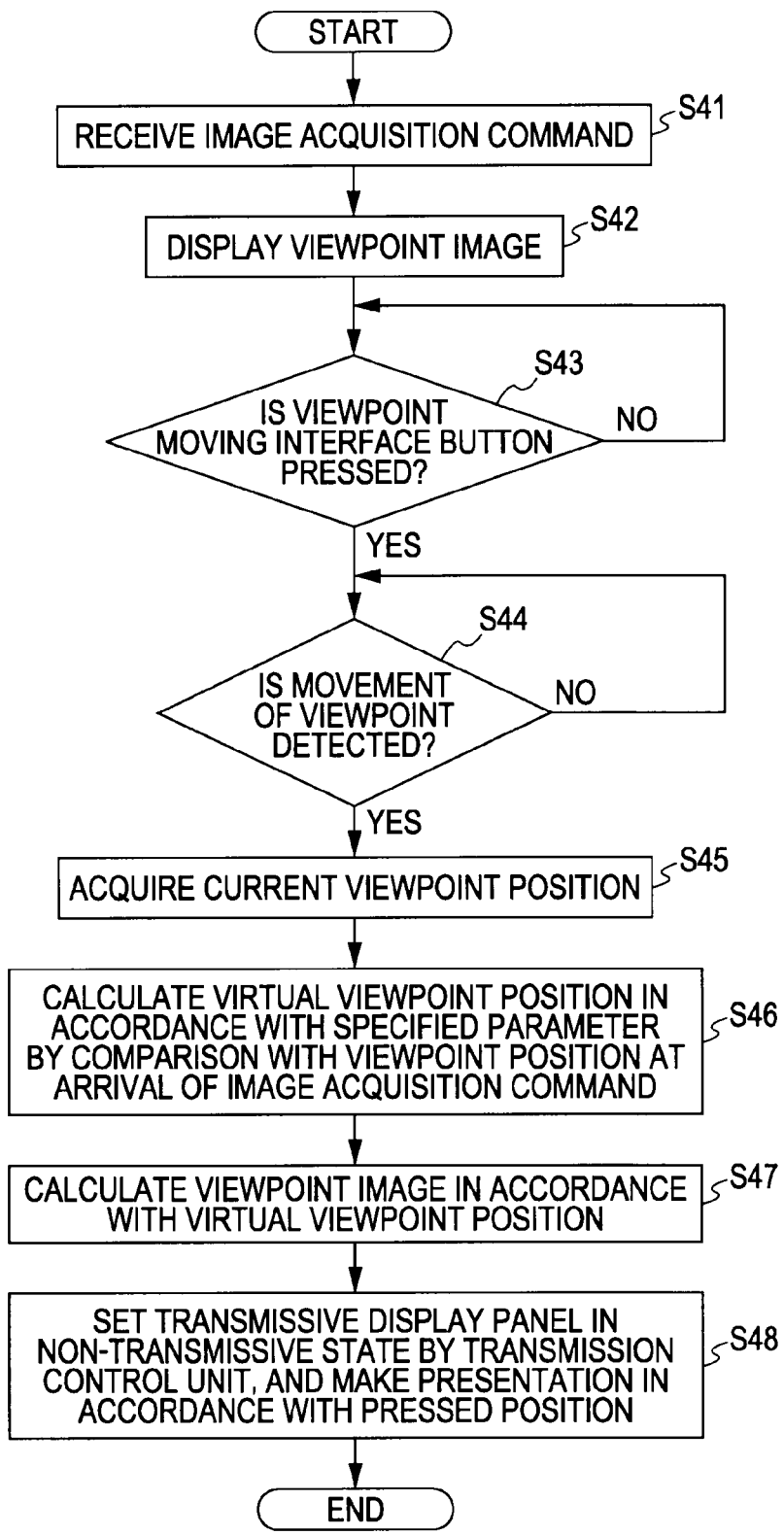
FIG. 14 is a flowchart showing a procedure in accordance with the movement of the viewpoint in the embodiment.

FIG. 14 is a flowchart showing processing performed when the viewpoint is moved.

First, it is detected that the image acquisition button 5c is pressed by the user 10 (Step S41). In this case, a viewpoint conversion image is displayed on the transmissive display panel 12 (Step S42).

The control unit 20 determines whether or not the viewpoint moving button 5a is pressed (Step S43). When the control unit 20 determines that the viewpoint moving button 5a is not pressed, it repeats the determination in Step S43.

In contrast, when the control unit 20 determines that the viewpoint moving button 5a is pressed, it determines whether or not the viewpoint of the user 10 is changed (Step S44). When the control unit 20 determines that the viewpoint of the user 10 is not changed, it repeats the determination in Step S44.

In contrast, when it is determined that the viewpoint of the user 10 is changed, the viewpoint-position detecting unit 16 acquires a viewpoint position of the user 10 provided at the start of the current processing operation (Step S45). Then, the viewpoint-position detecting unit 16 compares the viewpoint position provided when the image acquisition button 5c is pressed (current viewpoint position) with the viewpoint position at the start of the processing operation, and calculates a virtual viewpoint position in accordance with the specified parameter (Step S46).

The viewpoint-position image calculation unit 17 calculates a viewpoint image in accordance with the obtained virtual viewpoint position (Step S47). Then, the transmission control unit 11 switches the transmissive display panel 12 to a non-transmissive state, and a viewpoint conversion image formed by the image presenting unit 7 is presented on the transmissive display panel 12 (Step S48). In this case, the image presented on the transmissive display panel 12 is an image the user 10 can view.

An operation of detecting the eye direction of the user 10 from the images taken by the eye cameras 3a and 3b will now be described with reference to FIGS. 15 to 17.

Figure 15A:
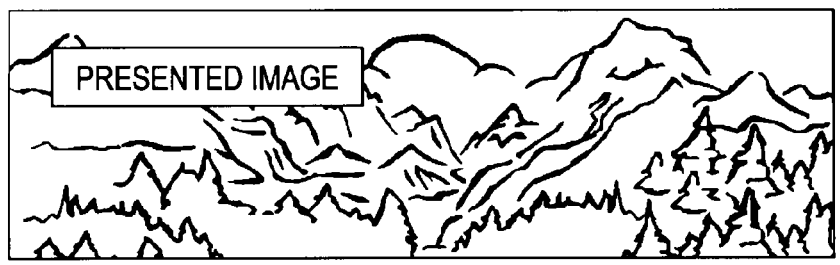
FIGS. 15A to 15C are explanatory views showing an example in which digital watermarks are inserted in a presented image in the embodiment.
Figure 15B:
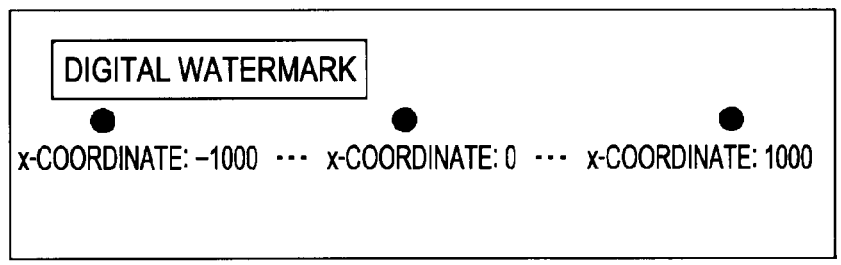
Figure 15C:
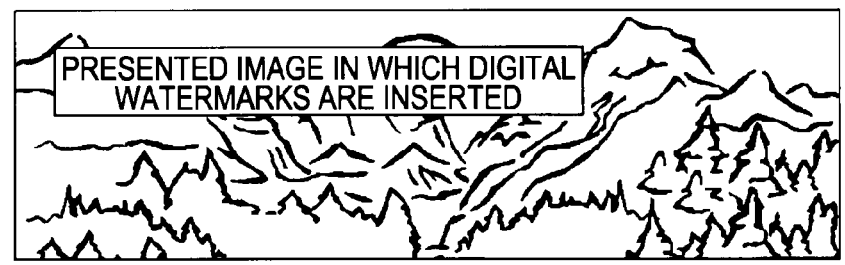

FIGS. 15A to 15C illustrate eye direction detection using digital watermarks.

FIG. 15A shows an example of an original image presented on the screen 9.

FIG. 15B shows examples of digital watermarks.

Digital watermarks are inserted as uniquely set identification (ID) signs along the X-coordinate axis in the screen 9. The center of the presented original image is designated as zero, and the digital watermarks are set at fixed intervals in the horizontal direction of the original image.

FIG. 15C shows examples of digital watermarks inserted in the screen 9.

The user 10 does not see the digital watermarks in the image presented on the screen 9. However, the control unit 20 can recognize the digital watermarks inserted in the screen 9, and can calculate the eye direction.

Figure 16:
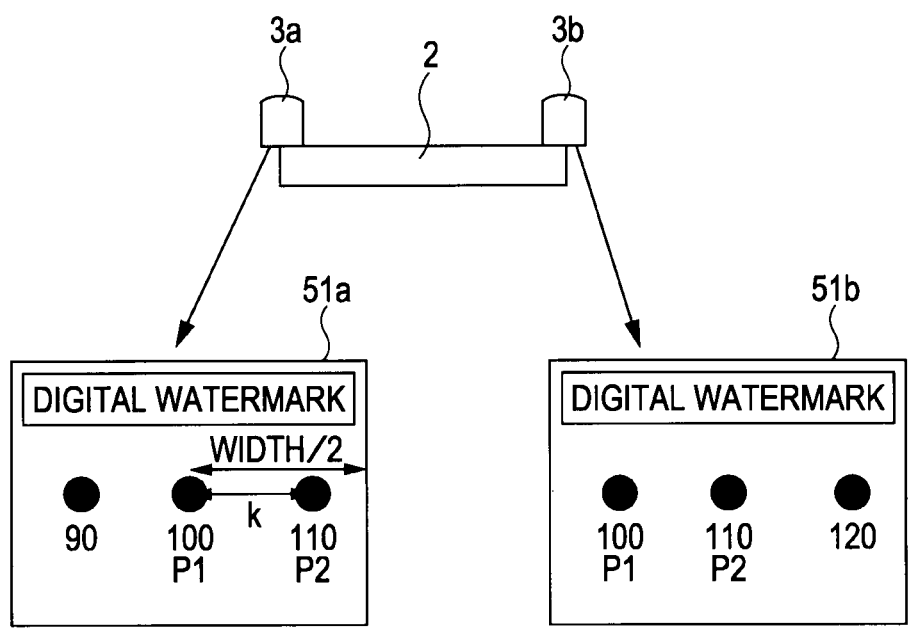
FIG. 16 is an explanatory view showing an example in which identification signs included in images captured by eye cameras are detected in the embodiment.

FIG. 16 shows how to detect identification signs inserted in an image presented on the screen 9, from images taken by the eye cameras 3a and 3b.

Identification signs 90, 100, 110 are inserted as digital watermarks in an image 51a captured by the eye camera 3a, and identification signs 100, 110, and 120 are inserted as digital watermarks in an image 51b captured by the eye camera 3b. The coordinates P1 is set for the identification sign 100, and the coordinates P2 is set for the identification sign 110. The distance between the identification signs is designated as k. The number of pixels in the horizontal direction of the eye cameras 3a and 3b is shown by a variable "width". The number of pixels in the vertical direction of the eye cameras 3a and 3b is shown by a variable "height".

Figure 17:
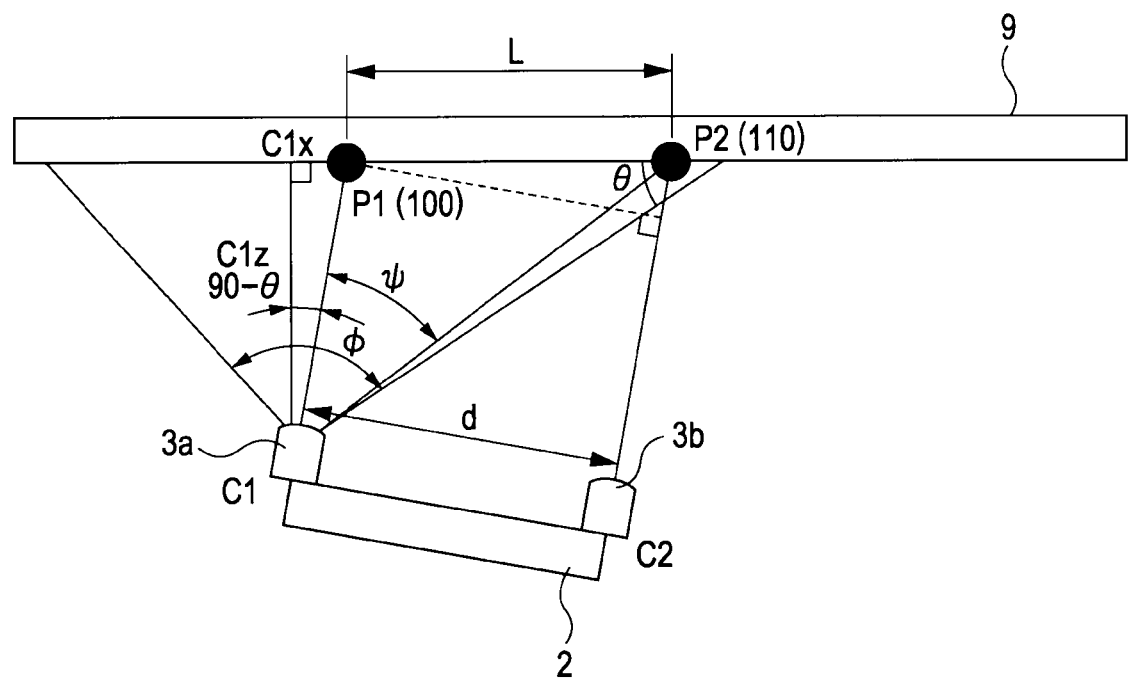
FIG. 17 is an explanatory view showing a relational relationship among the screen and two cameras in the embodiment.

FIG. 17 shows how to calculate the positional relationship between the screen 9 and the eye camera 3a.

First, data on the positions on the screen 9 where the identification signs are inserted and the types of identification signs are recorded in the image processing apparatus 25 beforehand. For this reason, the distance L between the coordinates of the digital watermarks is preset. Thus, the angle θ is given by the following Expression (8):

$$\sin(\theta) = \frac{d}{L} \quad (8)$$

The angle of view φ of the eye cameras 3a and 3b is an image-taking parameter, which is given during image taking. An angle ψ of the eye camera 3a with respect to a point P2 is given by the following Expression (9):

$$\tan \psi = \tan(\phi/2) \times k \div (\text{width}/2) \quad (9)$$

The position of the eye camera 3a is calculated from the points P1, P2, and C1 and the angles θ and ψ. The X-coordinate C1x and the Z-coordinate C1z of the point C1 are given by the following simultaneous equation (10):

$$(P1x - C1x)C1z = \tan(90 - \theta)$$

$$(P2x - C1x)C1z = \tan(90 - \theta + \psi) \quad (10)$$

Through a procedure similar to the above-described one, the coordinates of the eye camera 3b are obtained.

As a result, the position of the viewpoint of the user 10 relative to the transmissive display device 2 can be found from the images taken by the viewpoint-position cameras 4a and 4b. Thus, the position of the viewpoint of the user 10 relative to the screen 9 is found. Further, a straight line connecting the viewpoint position of the user 10 and the center of the transmissive display device 2 can be recognized as the eye direction of the user 10.

The above-described image processing apparatus 25 of this embodiment is useful in extracting a portion from an image projected on the screen 9 and displaying the image portion on the transmissive display device 2 placed at the user's hand. With the use of the transmissive display device 2, the viewing angle of the user is not limited, unlike the head mount display of the related art. Therefore, the user 10 can view the image at a wide viewing angle. In this case, information about the image on the screen 9 can be intuitively acquired by using not only the watched image, but also the peripheral vision outside the image frame of the transmissive display device 2. The acquired information is not subject to a time lag and deterioration of the image quality, and the depth thereof coincides with the position of the image projected on the screen 9. Even when an image viewed through the transmissive display panel 12 is a scene in the real world, the image can be intuitively acquired. This provides advantages similar to those provided when the image projected on the screen 9 is acquired.

After an image is acquired at hand of the user 10, a specific portion can be selected from the image, and can be enlarged and displayed. The user 10 easily acquires a desired portion from the image projected on the screen 9 or the scene in the real world, and can naturally view the image portion. In addition, since the transmissive display device 2 adopts a real-image optical system, the eyes of the user are not strained.

A plurality of persons each sometimes acquire necessary information with the transmissive display device 2 at hand while viewing an image projected on the screen 9. For example, an aerial photograph map and a symbol map corresponding to the aerial photograph map are sometimes selectively displayed on the screen 9. In this case, even when a plurality of users are watching an aerial photograph projected on the screen 9, they can individually and instantly acquire a symbol map, which is in phase with the aerial photograph map, by using the display device 2 held at hand.

When a plurality of persons view an image projected on the screen 9, indicators, such as flags and marks, can be superimposed on an image displayed on the transmissive display device 2. In this case, at a position specified by the user 10 and detected by the specified-position detecting unit 18, indicators are displayed in accordance with the position of an object close to the touch panel 6. The image processed in the transmissive display device 2 may be superimposed on the image projected on the screen 9. This allows an image processed by one user to be simultaneously viewed by other users.

Further, the user can specify a desired portion in the real world or the image projected on the screen 9, which is seen from the inside of the image frame of the transmissive display panel 12, by directly specifying a portion of the surface of the transmissive display panel 12.

The image captured into the transmissive display device 2 can be displayed on other display devices via the transmission interface 23.

Figure 18:
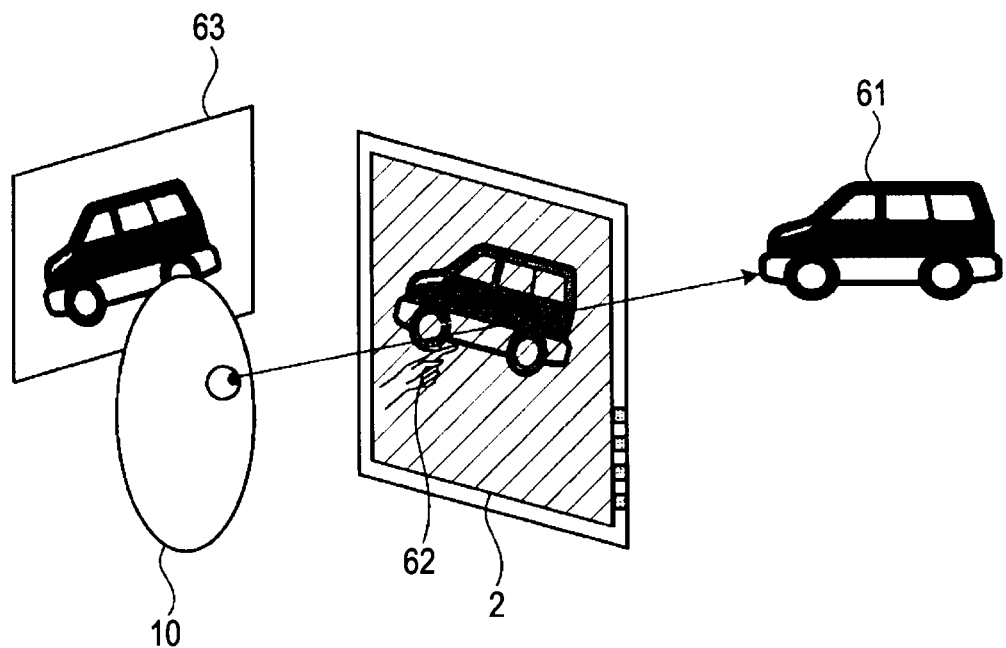
FIG. 18 is an explanatory view showing an example in which an image is presented on another display device in another embodiment of the present invention.

FIG. 18 shows an example in which an image is acquired using two display devices.

The user 10 acquires an image of an object 61 via the transmissive display device 2. When the user 10 indicates the displayed image of the object 61 by a finger 62 of the user 10, the image is displayed on another display device 63 that is provided, for example, beside the user 10.

This system can be applied to an electric train as an example. When the driver confirms safety with the index finger during driving the train, if the front window is not transmissive, as in the above-described embodiment, this is seriously dangerous. Thus, the image is displayed on another display device so that a desired image of the driver can be safely displayed in an enlarged manner.

While a small projector is used as the image presenting unit 7 in the above-described embodiment, a semi-transparent state can be obtained by, for example, liquid crystal. In this case, polarization is performed beforehand. Specifically, a polarized image is presented on a large screen, and the polarization rate is changed by controlling the liquid crystal. By thus designing the transmissive display device 2, the image can be presented on the transmissive display panel 12 in a semi-transparent state. This allows the presented image and the transmitted image to be presented in a superimposed manner.

While a series of operations in the above-described embodiment can be carried out by hardware, they may be carried out by software. When a series of operations are carried out by software, programs that form the software are installed in a computer incorporated in an exclusive hardware or a general-purpose personal computer capable of serving various functions according to various installed programs.

Alternatively, the operations can be carried out by supplying a recording medium, on which program codes of software for realizing the functions of the above-described embodiment are recorded, to the system or the apparatus, and reading the programs in the recording medium by a computer (or a control unit such as a CPU) in the system or apparatus.

In this case, the recording medium for supplying the program codes is, for example, a floppy disk, a hard disk, an optical disk, a magnetooptical disk, a CD-ROM, a CD-R, a magnetic tape, a nonvolatile memory card, or a ROM.

Alternatively, the functions of the above-described embodiment can be realized not only by executing the programs read out by the computer, but also by performing some or all of actual operations by an operating system running in the computer.

In this specification, the steps of writing the programs of the software may be performed in series in the described order, or may be performed in parallel or individually.

The present application contains subject matter related to that disclosed in Japanese Priority Patent Application JP 2008-114408 filed in the Japan Patent Office on Apr. 24, 2008, the entire content of which is hereby incorporated by reference.

It should be noted that the present invention is not limited to the above-described embodiments, and that other various modifications may occur without departing from the scope of the invention.

What is claimed is:

1. An image processing apparatus comprising:
   an input unit to which an image of an object picked up by an image pickup device is input;
   a touch screen display on which the image is presented together with touch screen controls;
   an image presenting unit configured to present the image on the touch screen display;
   a viewpoint detecting unit configured to detect a viewpoint position of a user; and
   a control unit configured to supply, to the image presenting unit, the image in an area extracted corresponding to an image frame of a display surface of the touch screen display when the image is viewed through the display surface from the viewpoint position of the user detected by the viewpoint detecting unit and the control unit enlarges the area extracted corresponding to an image frame of the display surface of the touch screen display upon movement of the image processing apparatus in a direction toward the user.

2. The image processing apparatus according to claim 1, wherein the control unit includes:
   a viewpoint-position image calculation unit configured to generate the image in the extracted area, on the basis of the viewpoint position of the user detected by the viewpoint detecting unit, an eye direction of the user found from the image picked up by the image pickup device, and a distance to the object; and
   a specified-position detecting unit configured to detect a specified position on the display surface of the touch screen display on which the image generated by the viewpoint-position image calculating unit is displayed.

3. The image processing apparatus according to claim 2, wherein the control unit switches between a transmissive state and a non-transmissive state of the display surface of the touch screen display, and supplies, to the image presenting unit, the image in the extracted area when the display surface is in the transmissive state.

4. The image processing apparatus according to claim 3, wherein the image presenting unit presents the image in the extracted area on the display surface of the touch screen display when the display surface of the display means is in the non-transmissive state.

5. The image processing apparatus according to claim 4, wherein the touch screen display is a real-image optical system.

6. The image processing apparatus according to claim 5, wherein a viewing angle for the area presented on the display surface of the touch screen display when the area is viewed from the viewpoint position of the user is smaller than a viewing angle for the object when the object is viewed through the display surface from the same viewpoint position.

7. The image processing apparatus according to claim 2, wherein the image pickup device is provided on a surface of the touch screen display opposite the viewpoint position of the user, and moves an image pickup direction in association with the touch screen display.

8. An image processing method comprising:
   inputting an image of an object picked up by an image pickup device;
   detecting a viewpoint position of a user;
   presenting the image on a touch screen display together with user touch controls;
   supplying, to an image presenting unit, the image in an area extracted from the image corresponding to an image frame of a display surface of the touch screen display when the image is viewed from the viewpoint position of the user through the display surface and
   enlarging the area extracted corresponding to an image frame of the display surface of the touch screen display upon movement of the image processing apparatus in a direction toward the user.

9. A non-transitory computer readable storage medium encoded with computer program instructions, which when executed by a computer perform a method of image processing, comprising:
   inputting an image of an object picked up by an image pickup device;
   detecting a viewpoint position of a user;

presenting the image on a touch screen display together with user touch controls;

supplying, to an image presenting unit, the image in an area extracted from the image corresponding to an image frame of a display surface of the touch screen display when the image is viewed from the viewpoint position of the user through the display surface and enlarging the area extracted corresponding to an image frame of the display surface of the touch screen display upon movement of the image processing apparatus in a direction toward the user.

10. An image processing apparatus comprising:

an input unit to which an image of an object picked up by an image pickup device is input;

a touch screen display device on which the image is presented together with screen controls;

an image presenting unit configured to present the image on the touch screen display device;

a viewpoint detecting unit configured to detect a viewpoint position of a user;

a control unit configured to supply, to the image presenting unit, the image in an area extracted corresponding to an image frame of a display surface of the touch screen display device when the image is viewed through the display surface from the viewpoint position of the user detected by the viewpoint detecting unit and the control unit enlarges the area extracted corresponding to an image frame of the display surface of the touch screen display upon movement of the image processing apparatus in a direction toward the user.

* * * * *